United States Patent
McCloy-Stevens

(10) Patent No.: US 8,519,691 B2
(45) Date of Patent: Aug. 27, 2013

(54) CURRENT LIMITING FOR DC-DC CONVERTERS

(75) Inventor: Mark McCloy-Stevens, Edinburgh (GB)

(73) Assignee: Wolfson Microelectronics plc, Edinburgh (GB)

(*) Notice: Subject to any disclaimer, the term of this patent is extended or adjusted under 35 U.S.C. 154(b) by 281 days.

(21) Appl. No.: 12/841,589

(22) Filed: Jul. 22, 2010

(65) Prior Publication Data

US 2011/0018515 A1    Jan. 27, 2011

Related U.S. Application Data

(60) Provisional application No. 61/228,002, filed on Jul. 23, 2009, provisional application No. 61/261,117, filed on Nov. 13, 2009.

(30) Foreign Application Priority Data

Jul. 22, 2009 (GB) .................. 0912745.7
Oct. 27, 2009 (GB) .................. 0918793.1

(51) Int. Cl.
*G05F 1/565* (2006.01)

(52) U.S. Cl.
USPC ............... 323/284; 323/285; 323/287

(58) Field of Classification Search
USPC ....... 323/282, 284, 285, 286, 287; 363/56.03
See application file for complete search history.

(56) References Cited

U.S. PATENT DOCUMENTS

| | | | |
|---|---|---|---|
| 5,808,455 A | 9/1998 | Schwartz et al. | |
| 6,166,528 A * | 12/2000 | Rossetti et al. | 323/283 |
| 7,019,507 B1 * | 3/2006 | Dittmer et al. | 323/284 |
| 7,049,879 B2 * | 5/2006 | Osamura et al. | 327/419 |
| 7,915,871 B2 * | 3/2011 | Wang et al. | 323/222 |
| 8,044,648 B1 * | 10/2011 | Kahn et al. | 323/282 |
| 2005/0035748 A1 | 2/2005 | Inn | |
| 2006/0050449 A1 * | 3/2006 | Wu | 361/18 |
| 2006/0221528 A1 * | 10/2006 | Li et al. | 361/100 |
| 2008/0122419 A1 * | 5/2008 | Shimizu et al. | 323/282 |
| 2008/0297122 A1 | 12/2008 | Zhou et al. | |
| 2008/0309302 A1 | 12/2008 | Chen et al. | |
| 2009/0160410 A1 * | 6/2009 | Al-Shyoukh et al. | 323/266 |
| 2009/0315527 A1 * | 12/2009 | Kung et al. | 323/282 |
| 2010/0080022 A1 * | 4/2010 | Schmidt | 363/53 |

FOREIGN PATENT DOCUMENTS

GB    2 448 741 A    10/2008

* cited by examiner

*Primary Examiner* — Adolf Berhane
*Assistant Examiner* — Fred E Finch, III
(74) *Attorney, Agent, or Firm* — Dickstein Shapiro LLP

(57) ABSTRACT

Apparatus and method for providing current limiting in a DC-DC converter and especially to methods and apparatus suitable for a start-up mode of operation. The invention monitors the inductor (L) current when the high side supply switch is on against a peak current limit threshold. If the inductor current reaches the peak current limit threshold the high side switch is turned off. The inductor current when the low side switch is off is monitored against a valley current threshold. As long as the inductor current is above the valley current threshold turn on of the low side switch is inhibited. In this way current limiting is provided and the problems of stair-stepping are avoided. Embodiments employing lossless current sensing are described. The invention may be implemented in a start-up mode of operation wherein the converter is controlled purely by the peak current limit and valley current threshold which are increased over time.

29 Claims, 10 Drawing Sheets

CURRENT LIMITING FOR DC-DC CONVERTERS

This application claims the benefit of U.S. Provisional Application No. 61/228,002, filed Jul. 23, 2009, and U.S. Provisional Application No. 61/261,117, filed Nov. 13, 2009.

BACKGROUND OF THE INVENTION

1. Field of the Invention

This invention relates to voltage converters, especially to DC-DC or switched voltage regulators and to methods and apparatus for control of such regulators, in particular to providing current limiting control, for example for protecting from a current overload or short-to-ground situation and/or during start up.

2. Description of the Related Art

Voltage converters such as DC-DC converters are used in a range of different applications. FIG. 1 shows a typical application where processor circuitry 101, which may, for example, be a processor of a portable electronic device, is supplied with a voltage $V_{OUT}$ (102) by a DC-DC converter 100. The DC-DC converter 100 receives an input voltage $V_{IN}$ (103) and an external clock signal CLK (104) and outputs the required voltage output $V_{OUT}$ (102). Typically the required processor supply voltage varies with processor frequency, which can vary with processing load. When the processing load is light, the processor reduces its operating frequency and hence the required voltage in order to save power. The processor circuitry 101 therefore provides voltage select signals $V_{SEL}$ (105) to the DC-DC converter 100 to select an appropriate voltage output $V_{OUT}$. The voltage select signals may be digital signals for controlling a programmable element of the DC-DC converter, such as a level shifter, as will be described later. The DC-DC converter 100 may also be operable in various modes, as will be described later, and the processor circuitry may select a particular mode of operation by appropriate mode control signals MODE (106). It will be appreciated that DC-DC converters may be used to provide power to device sub-systems other than processors and the embodiments described herein are generally applicable to many DC-DC converters or switched voltage regulators used for many applications.

A conventional current-mode buck (i.e. step down) DC-DC converter 200 is shown in simplified form in FIG. 2. The converter 200 comprises two nested feedback loops, an inner Current Control loop and an outer Voltage Control loop.

The Current Control loop block 201 takes an input signal $V_{ERROR}$ and a current sense signal ISNS fed back from the output stage and generates pulse-width modulated drive signals for the output stage 202. The voltage on the output stage output node LX is switched between ground and supply, $V_{IN}$, at a controlled duty cycle, resulting in a triangular current waveform in the inductor L. The inductor L and output capacitor C1 act as a filter to ensure an average voltage $V_{OUT}$ at an output node 203.

In operation the inductor current is sensed, and compared with $V_{ERROR}$. So this feedback loop generates an output sensed current varying according to the input signal $V_{ERROR}$. In many conventional DC-DC converters the sensed current is a peak current, although it is known to use an average current in some converters. Alternatively the minimum or "valley" current may be used to control the duty cycle of the converter.

Variation of the delivered output current, smoothed by the output filter L, C1, modulates the output voltage at $V_{OUT}$. This voltage $V_{OUT}$ is fed back, translated down to an appropriate voltage $V_{OUT\_LS}$ by a Level Shifter, or Voltage Shifter, block 204, to the input of a Voltage Error Amplifier block 205. The Voltage Error Amplifier block 205 compares this processed version of $V_{OUT}$ with a supplied reference voltage $V_{REF}$ and provides the error signal $V_{ERROR}$ which drives the above described inner feedback loop to close the outer feedback loop and thus stabilize $V_{OUT}$ at the desired voltage.

The Level Shifter 204 is illustrated as a resistive potential divider. The level shifter applies a conversion to the level of $V_{OUT}$ such that, when $V_{OUT}$ is equal to the desired or target output voltage, the level shifted signal $V_{OUT\_LS}$ has a known relationship to the reference voltage $V_{REF}$ (e.g. the level shifted signal $V_{OUT\_LS}$ may be equal to $V_{REF}$ when $V_{OUT}$ is exactly the desired output voltage). The Level Shifter 204 may be programmable, mechanically or digitally, to provide different voltage scaling or shifting circuitry, so as to allow the converter to be configurable to output different values of $V_{OUT}$. For instance, it may be programmable by a digital multi-bit signal, such as the $V_{SEL}$ signal generated by a processor as shown in FIG. 1.

The Voltage Error Amplifier block 205 is illustrated as including an Operational Transconductance Amplifier (OTA) 206 driving an RC network 207, but could include some other amplifier. The RC network 207, or other impedances provide closed-loop stabilization.

The Current Loop Control block 201 receives a signal 208 from the output stage 202 which passes through a Current Sensor Amp block 209 to pre-condition it, for instance to scale or strobe the signal, representative of the inductor current, to generate a convenient current sense signal ISNS. A duty modulator 210 compares the ISNS signal to the input $V_{ERROR}$ to derive drive signals of the appropriate duty cycle to drive the output stage devices (10, 20) on and off via a Switch Driver buffer stage 211. The Duty Modulator 210 may require a clock signal 212 and a Ramp Generator 213 to generate the necessary sequence of pulses as would be understood by one skilled in the art. The ramp Generator 213 may generate a slope compensation ramp signal VISLP which may be added either in whole or in part to the ISNS signal and/or the $V_{ERROR}$ signal so as to prevent sub-harmonic oscillations as would be well understood by one skilled in the art.

The Output Stage 202 in general will have a high-side driver device such as a PMOS transistor 10 to switch the output to the high-side supply rail 214 ($V_{IN}$) and a low-side driver device such as an NMOS transistor 20 to switch the output to the low-side supply rail 215 (Ground). The Output Stage 202 is also required to supply information, i.e. an indication, of inductor current signal 208, to feed back to the Current Control block 201.

In electronic equipment in general, and particularly for fast-moving segments such as portable consumer devices (e.g. mobile phones, MP3 players etc), there is a relentless push to use the latest processor technology to increase the device capability and feature set while reducing power and cost. As the next generation of processors becomes available, lower operating voltages are used than in previous-generation processors so as to allow a reduction in process feature size, i.e. W/L, that enables a greater level of integration. This is beneficial in terms of reduced die size, reduced die cost and reduced power consumption.

These trends result in two design challenges for DC-DC converters to service these applications: one induced by the choice of the value of the low voltage; the other by battery technology lagging behind the change to lower processor supply voltages.

(i) The reduction in processor supply voltage requires a much tighter control—in absolute terms—of the DC-DC converter output voltage under prevailing processor load and battery conditions. If the control over the processor supply voltage is not sufficient, problems with under- or overvoltage may occur; both are equally undesirable.

(ii) Since the battery terminal voltage has not dropped appreciably, and the duty cycle of a DC-DC converter is given by the ratio of $V_{OUT}/V_{IN}$, duty cycles must therefore reduce. This, coupled with the desire for small external components pushes the DC-DC converter to high operating frequencies, resulting in extremely short switch on i.e. conduction, times. The increase in switching speed afforded by the reduction in transistor feature size is not normally available for the power switches since the interface components must be rated to battery voltage.

Since small conduction periods, i.e. on times, of the power switches are difficult to control, it is becoming increasingly difficult to control the lower processor output voltages with adequate accuracy using traditional Peak Current Mode control methods. Valley Current Mode (VCM) is an alternative method of control of a DC-DC converter which has been proposed. This method of DC-DC loop control controls the input transistor off, i.e. non-conduction, time, rather than the on time. For the low duty cycle required, the non-conduction time is longer than the conduction time, so is therefore easier to control. Also VCM is known to offer an inherently higher bandwidth and an improved transient response.

One known problem with DC-DC converters is voltage overshoot and large in-rush currents on start-up of the converter. This is especially an issue for Valley Current Mode converters as the high side device driver current is only indirectly controlled. A start-up mode which minimises these problems, but allows start up to the full load would be advantageous.

Another known problem with DC-DC converters is providing current limit protection for current overload situations such as protection against short-to-ground. Conventional current limiting schemes conventionally monitor the PMOS current for the purposes of current limiting and provide turn off of the PMOS when the current limit is reached. However, in a short-to-ground situation the voltage difference across the inductor can be high during the PMOS conduction period and near zero during the NMOS conduction period, with the result that the inductor current decays slowly. Even turning the PMOS on for a short period, sufficient to allow comparison to the current limit, can increase the current than more than it decays during the rest of the cycle. This results in so-called stair-stepping of the inductor current, where the inductor current is ramped up on a cycle by cycle basis.

SUMMARY OF THE INVENTION

It is therefore an aim of the present invention to provide methods and apparatus for control of DC-DC converters which at least mitigate at least some of the above mentioned problems.

Thus according to the present invention there is provided a method of current limiting in a DC-DC converter comprising: monitoring, when a high side switch is turned on, whether a first signal indicative of the current in the converter is above a first threshold; in the event that the first signal is above the first threshold, turning the high side switch off; monitoring, when the high side switch is turned off, whether a second signal indicative of the current in the converter is above a second threshold; and in the event that the second signal is above the second threshold, inhibiting turn on of the high side switch.

The method of this aspect of the present invention provides a method of current limiting in a DC-DC converter. As the skilled person will readily appreciate a DC-DC converter comprises an element, such as an inductor, which is switched between a high side voltage supply and a low side voltage supply by control of high side and low side switches respectively. The high and low side switches may comprise transistors such a PMOS switch and an NMOS switch respectively. The method provides current limiting by monitoring a first signal, indicative of the current flow in the converter, i.e. the current flowing through the inductor, when the high side switch is on, against a first threshold. If the current goes above the first threshold the high side switch is turned off. In other words the first threshold acts as a peak current limit for the current flowing in the converter. The method also involves, when the high side switch is off, monitoring a second signal indicative of the current, i.e. the inductor current, against a second threshold. If the second signal is above the second threshold turn on of the high side switch is inhibited. Thus, the high side switch can only be turned on if the inductor current is not above the second threshold which acts as a valley current threshold. Using two thresholds provides a method of current control that controls both the peak current delivered and the average current. It will of course be appreciated that in current mode control of a DC-DC converter the duty cycle of the converter is determined based on a comparison of the inductor current with a voltage error signal which is sometimes referred to as a peak threshold in peak current mode or a valley threshold in valley current mode. The first and second thresholds of the present method provide a peak current limit and a valley current threshold but these are separate limits to the voltage error threshold and are imposed to provide current limiting.

The present method avoids the problem of stair-stepping that can in occur in a short-to-ground type situation where the voltage at the output node is low. In such a situation the rate of current increase when the high side switch is on can be significantly greater than the rate of current decrease when the low side switch is on. In such a situation, even if the high side switch is turned on only for a small part of each cycle, the resultant increase in current is greater than subsequent decrease during the rest of the cycle. The method of this aspect of the present invention avoids this problem as will be described in more detail later.

This method of current limiting can be applied during normal operation, i.e. operation involving normal usage of the converter, to protect from current overload/short-to-ground. The method may additionally or alternatively be used in a method of starting a DC-DC converter that minimises voltage overshoot and in-rush current as will be described in more detail later. By start-up is meant a period of transition from the DC-DC converter being inactive to normal operation. Start-up mode is usefully employed when the output voltage is significantly lower than the target output voltage and/or any load capacitors and the like are substantially discharged.

If it is determined that the first signal is above the first threshold, and the high side switch is thus turned off, the low side switch may also be turned on. In steady-state operation the first signal reaching the first threshold can be indicative of an undesired high current and thus turn on of the low side switch will help to reduce the current.

However, in some situations, for example where the imposed current limit is relatively low, such as may be used during start-up, the current, if the low side switch is turned on, could decrease to zero and then go negative before the high side switch would be turned on. Negative or reversed current flow effectively results in supplied charge being wasted. This is undesired, especially in a start-up mode as it reduces the average current and hence the output voltage and thus can increase, potentially significantly, the start up duration. In an extreme case, the current reversal may mean that the average current never gets high enough to get to normal regulation.

Thus in one embodiment the high side switch is turned off when the peak current limit is reached but the low side switch in maintained in a turned off state. As will be described in more detail later, if the low side switch is off and there is current flowing in the inductor (such as when the high side switch has been turned off or if the low side switch is turned off before the inductor current reaches zero) the current will flow through a parallel path such as a diode. As the skilled person will appreciate a transistor switch may have an associated parasitic body diode. Current may flow through this parasitic diode until the inductor current reaches zero. The diode will not conduct reverse current and thus the inductor current can not go negative, i.e. reverse. Passing a large current through a body diode may be undesirable but in some embodiments an external diode or other unidirectional current carrying device may be provided in parallel to the low side switch to conduct current when the low side switch is off.

If the first signal goes above the first threshold, i.e. the inductor current reaches the peak current limit, the high side switch is turned off. At this point the low side switch may also be turned on so that the current starts to decrease. In some embodiments the low side switch is maintained on to recirculate current until the high side switch turns back on. Turn on of the high side switch is inhibited if the second signal, i.e. the converter inductor current, is above the second threshold. Thus the high side switch may be inhibited from turning on in one or more subsequent cycles. Hence the low side switch may stay turned on for one or more cycles. Once turn on of the high side switch is no longer inhibited, the low side switch will turn off when the high side switch turns on.

However, as mentioned above, if the imposed current limit is relatively low, the current when the low side switch is turned on could decrease to zero and then go negative before the high side switch would be turned on. The method may therefore involve generating a low side off control signal to turn the low side switch off before the high side switch turns on. The low side off control signal may be generated be monitoring the second signal against a third threshold which may for example be set near zero current. Alternatively a third signal indicative of the current in the inductor when the high side switch is off could be monitored against the third threshold. This third signal, which is different to the signal used for monitoring against the valley current threshold, could also be derived by the properties of the low side switch, e.g. the source drain voltage of an NMOS say. A simple comparator circuit could be used to monitor against the third threshold.

The method involves inhibiting turn on of the high side switch if the second signal is above the second threshold, i.e. the converter inductor current is above a valley current threshold. If the inductor current subsequently drops so that the second signal reaches the second threshold, turn on of the high side switch is no longer inhibited. However the high side switch does not necessarily turn on as soon as the second signal is no longer above the second threshold. Instead the high side switch only turns on in response to a first control signal which is generated by the converter in accordance with its mode of operation.

For example, in the relevant mode of operation, for example in normal operation of a peak current mode converter, the high side switch may normally be turned on in response to a clock signal. The first control signal may therefore be derived from a clock signal. In such an embodiment if the high side switch is turned off due to reaching the peak current limit and the converter current subsequently drops below the valley current threshold, i.e. the second signal drops to the second threshold, before the next clock pulse, the high side switch will not turn on at that point. Instead the high side switch will only turn on at the next clock pulse, in line with normal operation of the converter.

If the second signal only reaches the second threshold after the next clock pulse the high side switch may or may not turn on depending on the nature of the first control signal. If the first control signal generates a request to turn the high side switch on which is maintained until the high side switch does indeed turn on, then the high side switch will turn on as soon as it is no longer inhibited. In this case the high side switch, when turned off, turns back on at the later of the next clock pulse or the second signal reaching the second threshold. However if the first control signal generates successive requests to turn the high side switch on (in synchronism with appropriate clock pulses) but does not maintain an on-request, then if the second signal drops to the second threshold between such requests the high side switch will only turn on at the next such on-request, i.e. relevant clock edge.

In valley current mode control of the high side switch is based on a comparison of inductor current against voltage error (plus slope compensation) and thus the first control signal may comprise the result of such comparison. Whether or not the high side switch turns on as soon as the second signal drops to the second threshold will therefore depend on the current state of the comparison.

As mentioned above the method may be used in a start-up mode of operation. In the start-up mode of operation this current control may be used as the only method of controlling the high and low side switches, in other words a current loop control is used and the normal voltage loop and current loop are effectively ignored. The voltage loop control may be left inactive or disabled during the start-up mode of operation. Thus in the start up mode of operation the high side switch will be turned on until the first signal reaches the first threshold. At this point the high side switch will be turned off and subsequent turn on of the high side switch will be inhibited until the second signal reaches the second threshold. Preferably in the start-up mode turn on of the high side switch is controlled by a first control signal derived from a clock signal, preferably a constant frequency clock signal. Thus when the high side switch is turned off when the first threshold is reached the high side switch is kept turned off at least until the next clock pulse. This can provide a constant frequency start-up mode of operation.

As mentioned above, in the start-up mode of operation the current limits applied may be low, at least initially. Hence the current when the low side switch is on could drop to zero, or go negative, before the high side switch turns on in response to the next clock pulse. Thus, as mentioned above, the method may involve turning the low side switch off before the current goes negative.

During the start-up mode of operation the first and/or second threshold may be increased over time. The first threshold sets the peak current during the start-up mode of operation and by increasing this threshold over time the maximum current drawn from the supply can be limited. Preferably both thresholds are increased during the start-up mode of operation. By increasing both the first and second thresholds over a period of time the voltage output of the converter will increase over time and the peak and average current output can be controlled. Conveniently the first and/or second thresholds are increased in a series of steps. In one embodiment the initial level for the second threshold may be zero, i.e. the inductor current must fall to zero before the high side switch can turn back on.

The first and/or second thresholds may be gradually increased during start-up mode of operation until the output voltage reaches a set output voltage threshold. Once the output voltage threshold is reached the converter may transition to a normal mode of operation. In the normal mode of operation the voltage loop control is activated.

The normal mode of operation may be a peak current mode or a valley current mode. Thus the method may involve turning the high side switch on in response to a clock signal during the start up mode of operation and subsequently turning the low side switch on in response to the clock signal in a valley current mode of normal operation.

Once normal mode of operation is reached the current limiting may be disabled. In other words the current limiting may be applied during a start-up mode of operation only. However the method may involve applying new first and second thresholds during normal operation to provide over-current/short-to-ground protection.

In some embodiments the second threshold may be set to a level which is below the first threshold but this is not necessarily the case. The second threshold may be set at the same level or higher (in terms of actual inductor current) than the first threshold. One or both of the first and second thresholds may be altered in response to the operating conditions of the converter.

In some embodiments turn on of the high side switch is only inhibited based on the second threshold if the high side switch was turned off based on the first threshold. In other words only when the peak current limit has been reached is the valley current threshold enforced. In other embodiments however the thresholds are monitored independently and the high side switch is inhibited from turning on if the second signal is above the second threshold whether or not the peak current limit has previously been reached.

At least one of the first threshold and the second threshold may varies according to at least one of the high side supply voltage, the output voltage of the converter, the switching frequency and the inductance of the inductor. The thresholds may therefore be set based in the high side supply voltage, i.e. an input voltage for the converter. Especially for battery powered devices the input voltage may vary over time based and thus the thresholds may be adjusted accordingly. Further the thresholds may be adjusted based on the output voltage, for instance as indicated by a Voltage select signal. The thresholds may also vary with switching frequency and/or the value of inductance of the inductor. The switching frequency may be fixed for a particular device or may be variable in use. The inductance of the inductor is a fixed aspect of the device but the same design of converter may be used with different inductors and hence the ability to set the thresholds based on inductance and/or frequency of operation is advantageous.

In another aspect the invention provides a DC-DC converter comprising: an inductor operably connected between a first node and an output node; a high side switch operably connected between a high side supply input node and the first node; a low side switch operably connected between a low side supply input node and the first node; switch control circuitry operable to control the said high side and low side switches; wherein the switch control circuitry comprises: first current limit circuitry for turning the high side switch off if a first signal indicative of the current in the inductor is beyond a first threshold; and second current limit circuitry for inhibiting turn on of the high side switch if a second signal indicative of the current in the inductor is beyond a second threshold.

The high side switch may comprise a p-channel transistor and the first current limit circuitry may comprise a first comparator arranged to compare the source-drain voltage of the p-channel transistor with the first threshold. The low side switch may comprise an n-channel transistor and the second current limit circuitry may comprise a second comparator arranged to compare the source-drain voltage of the n-channel transistor with the second threshold.

The switch control circuitry may be configured to, in a start-up mode of operation, control turn on of the high side switch based on a clock signal.

Preferably the first current limit circuitry is configured, in a start-up mode of operation, to increase the first threshold over time and/or wherein the second current limit circuitry is configured, in said start-up mode of operation, to increase the second threshold over time.

The switch control circuitry may be configured to turn the low side switch off if the current in the inductor when the low side switch is on reaches a third threshold.

The switch control circuitry may be configured, in a normal mode of operation, to provide valley current mode control.

In a further aspect of the invention there is provided a method of controlling a DC-DC converter comprising an inductor operably connected to a PMOS switch and an NMOS switch, the method comprising: monitoring the PMOS switch current against a PMOS current limit; in the event that the PMOS current limit is reached, turning the PMOS switch off; monitoring the NMOS switch current against a NMOS current limit; in the event that the NMOS current limit is reached, maintaining the NMOS switch turned on and inhibiting turn on of the PMOS switch.

In another aspect of the invention there is provided a method of starting a DC-DC converter comprising the steps of: setting a first current limit and a second current limit; receiving a clock signal comprising a series of clock pulses; and monitoring at least one signal indicative of the current in the converter; wherein the method comprises the steps of repetitively: turning a high side switch off when the at least one signal indicative of the current in the inductor reaches the first current limit and keeping the high side switch off until at least the next clock pulse and subsequently turning the high side switch on after the at least one signal indicative of the current in the inductor reaches the second current limit.

In this method, in a first mode of operation, the step of subsequently turning the high side switch on may comprise turning the high side switch on at the first clock pulse following the time at which the at least one signal indicative of the current in the inductor reaches the second current limit.

In a second mode of operation, the step of subsequently turning the high side switch on may comprise turning the high side switch on at whichever occurs later of said next clock pulse or the time at which the at least one signal indicative of the current in the inductor reaches the second current limit.

The method may comprise operating in said first mode of operation during at least a first period and operating in said second mode during at least a second period.

The method may further comprise the step of turning the low side switch off if the inductor current is below a third threshold.

At least of the first current limit and the second current limit may be increased over time.

In a yet further aspect of the invention there is provided a method of providing a current limit for a DC-DC converter comprising a high side supply switch and a low side supply switch, the method comprising: providing a first control signal for turning the high side supply switch on in normal operation; and monitoring the current in the inductor against a first threshold when the high side supply switch is on and against a second threshold when the high side supply is off;

wherein the high side switch is turned off if the first threshold is exceeded and wherein the high side switch is inhibited from being turned on whilst the second threshold is exceeded; and wherein, when the high side switch is not inhibited from being turned on the switch is turned on in response to the first control signal.

Another aspect of the invention provides a method of start up for a DC-DC converter comprising: applying a first current limit to provide a peak current limit by turning a high side supply switch off; and applying a second current limit to inhibit turn on of the high side supply switch; wherein, when not inhibited from turning on the high side supply switch is turned on in response to a constant frequency clock signal.

A DC-DC converter as described above may be implemented in an integrated circuit such as a power management integrated circuit. A DC-DC converter as described may be implemented in an electronic device such as a portable computing device; a laptop computer; a personal data assistant; a personal media player; an mp3 player; a portable television; a mobile communications device; a mobile telephone; a navigation aid; a GPS device; or a game console.

In general the present invention relates to current limiting in Start-up and normal operation of a DC-DC converter providing short to ground protection, especially in Valley Current Mode Control.

The problems of excessive output voltage overshoot and excessive in-rush current on start-up of a (Valley Current Mode) DC-DC converter are solved by ignoring the voltage control loop and ramping up the output voltage with a current-controlled output stage with positive and negative current limits set to (a sequence of) values increasing with time. The circuitry can also be used for current-limit/short protection once in normal operation. The thresholds may be increased in steps during start-up mode or they may be ramped thresholds. The same output stage may also be used in normal mode as in start-up mode. Start-up mode may end once the output voltage reaches a predetermined threshold value.

The converter may be disabled and a Short-circuit may be flagged if the voltage threshold is not reached after a predetermined time.

The current may be sensed by drain-source voltages of the power switches and the current limits may be sensed by comparators attached thereto. The current may be sensed by a current sense amplifier with a comparator on the output in current mode or via a Resistor and direct voltage measurement.

Once switched off the PMOS can not be enabled until the later of the next clock-edge and the valley limit being reached.

Some of the start up current limit levels may be set using look up tables based on Vin and Vout (and also L and f).

The NMOS may be turned off if the inductor current approaches zero.

Preferably the start-up mode is combined with the error voltage compensation node being preset to a nominal value required on transition to normal control to reduce voltage overshoot and undershoot.

Although useful as a start-up mode of operation the current limits may also be used in normal operation, with or without PMOS limit trigger condition.

BRIEF DESCRIPTION OF THE DRAWINGS

The invention will now be described by way of example only with reference to the following drawings, of which:

FIG. 12b is a flow chart illustrating the switch control steps of the process shown in FIG. 12a.

DETAILED DESCRIPTION

Figure 1:
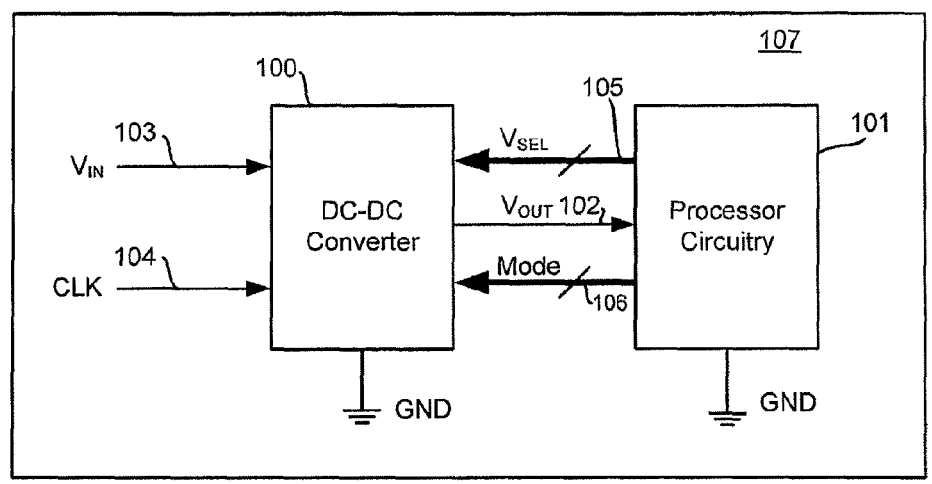
FIG. 1 shows a typical arrangement of a DC-DC converter arranged to power processor circuitry.

As discussed above FIG. 2 shows a conventional DC-DC converter. As described above, in operation, a signal representative of the current in the inductor is compared with the $V_{ERROR}$ signal to control switches 10 and 20.

The inductor current could be sensed using a series resistor in series with the inductor or the respective transistor. However the use of such series resistors introduces an extra source of resistive power loss and thus reduces the efficiency of the converter. Efficiency is, especially for battery powered devices, an important consideration. It is preferable therefore to use "lossless" sensing techniques; for example to sense the drain-source voltage across the PMOS due to its on resistance. This gives a voltage proportional to the PMOS current.

In operation of a conventional peak mode DC-DC converter the PMOS switch is turned on at an edge of the clock signal 212. In the lossless current sensing approach, i.e. in embodiments not having a sense resistor, the drain-source voltage of the PMOS is monitored to derive a current signal proportional to the current through the PMOS 10 and hence the inductor L. This current signal, appropriately scaled, is compared to the threshold $V_{ERROR}$ signal. When the current reaches the threshold the PMOS is turned off by switch driver 211 and the NMOS is turned on, i.e. the switching occurs at the peak of the inductor current. Practically a slope compensation ramp signal is applied to either or both the current signal or $V_{ERROR}$ signal prior to the comparison to prevent sub-harmonic oscillation. The effect is therefore that the current signal is compared with a threshold that ramps across each cycle.

The bandwidth of the current control loop is high, generating the appropriate pulse width on a cycle-by-cycle basis, whereas the bandwidth of the outer, voltage control, loop is relatively low, so the current loop may be analysed assuming a substantially static input voltage $V_{ERROR}$.

The terminal LX of the inductor L is switched to $V_{IN}$ for a fraction D of each clock cycle and to ground for the remaining fraction 1-D of each cycle. The average voltage at node LX is thus $D*V_{IN}$. The output capacitor C1 is large enough for the voltage $V_{OUT}$ to be substantially constant within each cycle, so the average voltage at $V_{OUT}$ is also $D*V_{IN}$. So for small $V_{OUT}$ relative to $V_{IN}$, the duty cycle $D=V_{OUT}/V_{IN}$ may be small.

Also there is a push towards faster clocking frequencies to allow the use of lower value, physically smaller, inductors, which would further reduce the PMOS on-time, and the time available to sense its current.

As mentioned previously control of very short switching times is difficult. An alternative mode of control therefore uses Valley Current Mode (VCM) control. In VCM the NMOS switch 20 is turned on at a clock edge and the current in the inductor during the NMOS conduction period is monitored. When the inductor current drops to the $V_{ERROR}$ threshold (as modified by the slope compensation ramp) the NMOS is turned off and the PMOS is turned on, i.e. the switching is controlled by the lowest inductor current or the valley current. For short duty cycles the NMOS switch may be turned on for significantly longer than the PMOS switch and so Valley Current Mode control can ease some aspects of control of a DC-DC converter at low output voltages.

Figure 3:
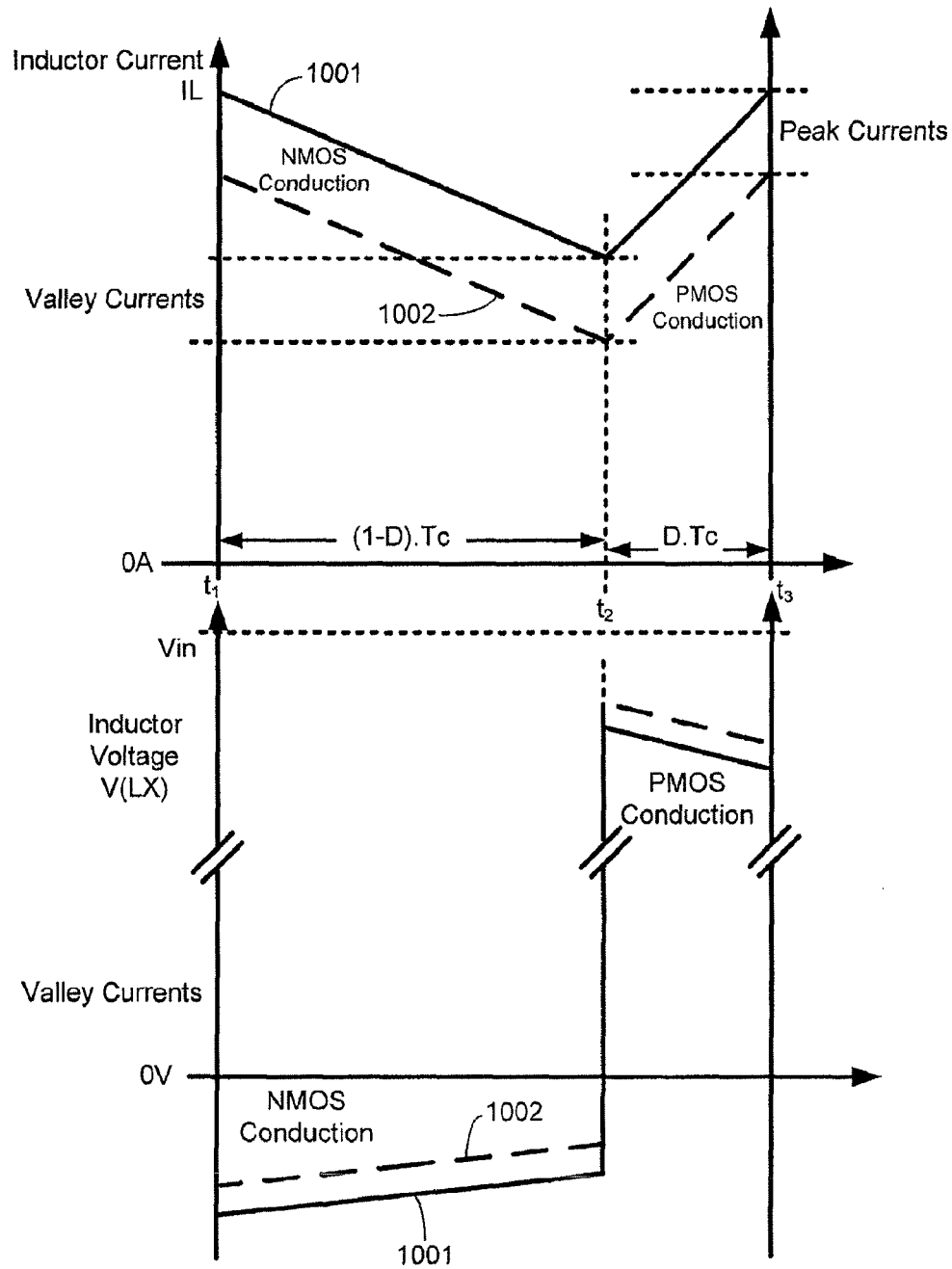
FIG. 3 illustrates inductor current and voltage waveforms during a single cycle in normal operation.

FIG. 3 illustrates the inductor current and the voltage at the output stage output terminal, LX, during one cycle of a set of repetitive cycles. The solid curves 1001 show waveforms for a higher average current, the dashed curves 1002 show waveforms for a lower current (assuming constant $V_{IN}$ and $V_{OUT}$). The upper part of FIG. 3 shows the current curves at node LX and the lower part of the figure illustrates the voltages. During the first part of the illustrated cycle, i.e. between $t_1$ and $t_2$, the NMOS is conducting and LX is near ground while the other end of the inductor is kept at $V_{OUT}$ by the output capacitor. The current therefore decreases at a slope $dI_L/dt=V_{OUT}/L$. During the second part of the cycle, i.e. between $t_2$ and $t_3$, the PMOS is conducting and the voltage of node LX is near supply, $V_{IN}$, while the other end of the inductor is kept at $V_{OUT}$ by the output capacitor, so the current increases at a slope $dI_L/dt=(V_{IN}-V_{OUT})/L$. If the load current demand decreases the current waveform maintains substantially the same slopes, but moves downwards to reduce the average current supplied to the capacitor and eventually to the load, as illustrated by dashed curve 1002 representing a lower average current. As shown in the lower part of the FIG. 3, the voltage at LX does not quite reach ground or $V_{IN}$ while passing this current, due to the I.R drop of the conducting NMOS or PMOS. For a converter with good efficiency, these I.R drops are small compared to $V_{OUT}$, so do not greatly affect the current waveforms, but are exaggerated in FIG. 3 for the purposes of explanation.

DC-DC converters are typically provided with current limiting circuitry for limiting the maximum current delivered by the converter. This is to prevent the converter from delivering very high output currents in a current overload situation or high current fault such as a short-to-ground situation. As will be appreciated various situations may lead to a current overload but a short-to-ground will generally lead to a high current overload in the absence of current limiting. Embodiments of the present invention will be described in relation to a short-to-ground situation but it will be appreciated that the methods and apparatus are applicable to any type of current overload or high current fault.

As mentioned above, when the PMOS switch is on, the current increases at a slope $dI_L/dt=(V_{IN}-V_{OUT})/L$. However, in a short-to-ground situation, $V_{OUT}$ may be dragged low and may be at or near zero. Therefore the voltage drop across the inductor when the PMOS is on is of the order of $V_{IN}$. Thus there is a very steep increase in current when the PMOS switch is on. Conversely, when the NMOS switch is on the inductor current decreases at a slope $dI_L/dt=V_{OUT}/L$ but $V_{OUT}$ is near zero and hence there is very gradual decrease in current.

Significant over-current flowing through the DC-DC converter could result in damage to the circuitry in the power domain connected to the DC-DC converter or to the converter itself. An over-current flowing through the inductor can lead to a catastrophic reduction in inductance, which actually exacerbates the problem as the current ramp rates increase as the inductance decreases. If this situation persists the increasing over-current can lead to destruction of the converter. In some converters, even if the inductor may be able to handle a certain over-current the other circuitry or even the bond wires, package or pcb may be damaged by a high over-current.

Typically therefore a current overload limit is applied to the DC-DC converter to limit, in use, the maximum current flow in the inductor. If the current flow reaches the current limit the PMOS is turned off and the NMOS turned on, whatever the point in the cycle. The current in the inductor can, as mentioned above, be determined by monitoring a dedicated sense resistor but the presence of a sense resistor leads to resistive losses in the normal operation and reduces the efficiency of the converter. Thus lossless sensing may be preferred in some applications.

In lossless type control the inductor current when the PMOS is on is determined by monitoring the electrical properties of the PMOS when it is on. This can however lead to the problem of so called stair-stepping because the PMOS current can only be determined when the PMOS is on and there will be a finite time delay between turning the PMOS on, determining the current is above the current limit and subsequently turning the PMOS off. This finite time delay is due to comparator propagation delays and the like. This effectively means that even if the inductor current is greater than the current limit when the PMOS is turned on there will be a minimum period of time when the PMOS is on before it can turn off. Depending on $V_{IN}$, the inductance of the inductor and the clock frequency (i.e. the duration of each cycle) the situation can arise where the increase in current during this minimum PMOS conduction period is greater than the subsequent decrease due to the NMOS conduction in the remainder of the cycle. Thus each cycle the inductor current increases even though the current limit has been exceeded.

Figure 4:
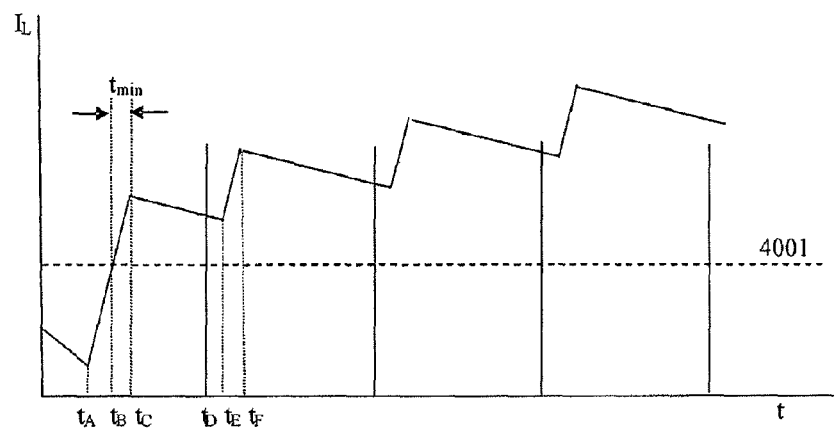
FIG. 4 illustrates a problem with conventional current limiting schemes.

FIG. 4 illustrates the problem with this approach. FIG. 4 represents the current in the inductor operating in valley mode. The same problem can also occur in converters operating in peak mode.

At time $t_A$ a short to ground situation occurs. For ease of explanation as shown in FIG. 4 the short-to-ground occurs at the time that the NMOS turns off and the PMOS turns on. Clearly however a short-to-ground could occur at any point in the cycle. As the PMOS is turned on, the inductor current increases rapidly due to a voltage drop equal to nearly all of $V_{IN}$ across the inductor. At time $t_B$ the current limit 4001 is reached. However, due to propagation delays in the comparator and other circuitry delays the PMOS switch only turns off later at a time $t_C$. The time difference between $t_B$ and $t_C$ is equal to $t_{min}$, the minimum conduction period of the PMOS due to the current limiting circuitry. At the point $t_C$, at which the PMOS is actually turned off, the NMOS is turned on and the current starts to decrease. However the current decreases at a relatively slow rate as there is only a small or no voltage across the inductor.

At time $t_D$ the next clock pulse is received. In Valley Current Mode the clock pulse, in normal operation, would control turn off of the PMOS and turn on of the NMOS. In this case the NMOS is already on and so it stays on. However, the voltage error may be relatively large (as the output voltage has been pulled low) and thus the PMOS may be turned on relatively soon into the cycle at time $t_E$. At this point the inductor current is still above the current limit but the current limit is only applied when the PMOS is on. When the PMOS turns on the relevant comparator will determine that the current is above the current limit and act to turn the PMOS off. Again however propagation delays will mean that the PMOS doesn't turn off instantly and it only actually turns off at a time $t_F$ later. Thus again there is a period of conduction, $t_{min}$, during which more current will be passed. It can therefore be seen that in this scenario the inductor current can increase in each cycle as the step of checking the PMOS current adds more current than can decay in the remainder of the cycle.

In an embodiment of the present invention therefore current limiting is provided by applying two current thresholds. The first threshold is a peak current limit imposed on the current flow while the PMOS is turned on. The second threshold is a valley current threshold applied while the PMOS is turned off. This valley current threshold is also used in control of the PMOS in that, if the current flow is greater than the valley current threshold, then turn on of the PMOS is inhibited. It will of course be appreciated that the thresholds referred to here are current limit thresholds and are different to the voltage error threshold, $V_{ERROR}$, which is used in the current control loop to control switching of the PMOS or NMOS.

Thus if the PMOS is turned on and the peak current limit is reached the PMOS is turned off. However the PMOS is only subsequently turned on if the current in the inductor is below the valley current threshold when the PMOS would, in normal operation, be turned on.

The peak current limit is operated as a limit and, as described above, if the PMOS is turned on and the current reaches the current limit, then the PMOS is turned off, whatever the point in the cycle. As mentioned there will be propagation delays in the current limiting circuitry which means that the PMOS may only actually be turned off a short time later but in general the PMOS is turned off as soon as possible when the peak current limit it reached.

As mentioned when the peak current limit is reached the PMOS is turned off. At this point the NMOS may be turned on in order to reduce the inductor current. For applying current limiting in normal operation it is likely that reaching the peak current limit would turn the PMOS to turn off and the NMOS to turn on. In some situations however, for instance if the peak current limit is relatively low, reaching the peak current limit may cause the PMOS to turn off but the NMOS may not necessarily turn on. If the NMOS remains off the current will flow through a parallel path. As the skilled person will appreciate an NMOS device will typically have a parasitic body diode associated with it. If the NMOS is not turned on, and current is flowing through the inductor, current will continue to flow through the body diode until the current reaches zero (the diode will not conduct reverse current). Thus at low peak current limits, such as may be used in a start-up mode of operation as will be described later, reaching the peak current limit may result in the PMOS being turned off and the inductor current being allowed to reduce to zero by conduction through the body diode (or another separate external diode specifically arranged to provide a parallel path). At higher current limits however it may be undesirable to pass a large current through a body diode and thus reaching the peak current limit may result in the PMOS being turned off and the NMOS being turned on.

The valley current threshold is preferably operated as a threshold. Whilst the current is above the valley current threshold, turn on of the PMOS is inhibited. However, when the valley current drops below the threshold the PMOS may be turned on—in accordance with normal operation of the converter. That is, the PMOS is not necessarily turned on as soon as the current drops below the valley current threshold.

In a converter operating in peak mode the PMOS is normally turned on by a relevant clock edge of a clock signal and maintained on for as long as the inductor current signal is below $V_{ERROR}$ (including slope compensation). Thus, in a peak mode embodiment if the PMOS is turned on in one cycle and turned off because the current limit is reached, the NMOS will stay on at least till the next cycle, even if the inductor current is below the valley current threshold, because turn on of the PMOS is controlled by a clock edge. However, if the inductor current is still above the valley current threshold at the next clock edge, turn on of the PMOS is inhibited until the current drops below the valley current threshold.

In one embodiment, once the inductor current drops below the valley current threshold, turn on of the PMOS is no longer inhibited. In a peak current mode control this may therefore mean that the PMOS turns on at whatever point in the cycle the inductor current drops below the valley current threshold. Thus, in this embodiment, in the situation where turn on of the PMOS is inhibited at the start of a cycle due to the inductor current being above the valley current threshold, the turn on of the PMOS is not necessarily synchronised to a clock edge. Once turned on the PMOS remains on until the current in the inductor reaches $V_{ERROR}$ (including slope compensation) or the peak current limit is reached.

In another embodiment the turn on of the PMOS is always synchronised to a clock edge. Thus, once the inductor current (when the PMOS is off) drops below the valley current threshold, the PMOS turns on at the next relevant clock edge.

In a valley current mode converter the turn on of the PMOS is controlled based on a comparison of the inductor current with the error voltage signal $V_{ERROR}$. Thus, in a valley current mode converter, once the current drops below the valley current threshold, the PMOS will turn on if the current signal is below $V_{ERROR}$ (including slope compensation). If the short-to-ground situation is continuing it is likely that the PMOS will turn on very shortly after the current drops below the valley current threshold, as the short-to-ground will lead to an artificially high duty cycle but it will be noted that the current dropping below the valley current threshold merely allows the PMOS to be turned on—it does not inherently force turn on of the PMOS.

In all cases the converter is preferably arranged such that the PMOS is not turned on more than once in a single cycle. In a valley current mode converter once the PMOS has been turned on it would usually remain on until the end of the cycle. If the PMOS were turned on and the peak current limit reached, the PMOS would be turned off. If the inductor current were then to decay to below the valley current threshold before the end of the cycle in some embodiments it is possible that the PMOS could turn back on in the same cycle (as the slope compensated comparison between inductor current and $V_{ERROR}$ may suggest that the PMOS should be on). Were the PMOS to be turned on more than once in a cycle a very high freq current oscillation could occur. For a converter controlled by a fixed frequency clock the fixed frequency nature of operation would be lost. Further the converter will be worse controlled and tones will be present. Thus the converter may preferably be arranged so that if the PMOS is turned off in a cycle it remains off until at least the next cycle. The skilled person will of course appreciate however that it is possible to implement a converter where the PMOS may turn on more than once during a cycle.

Figure 5:
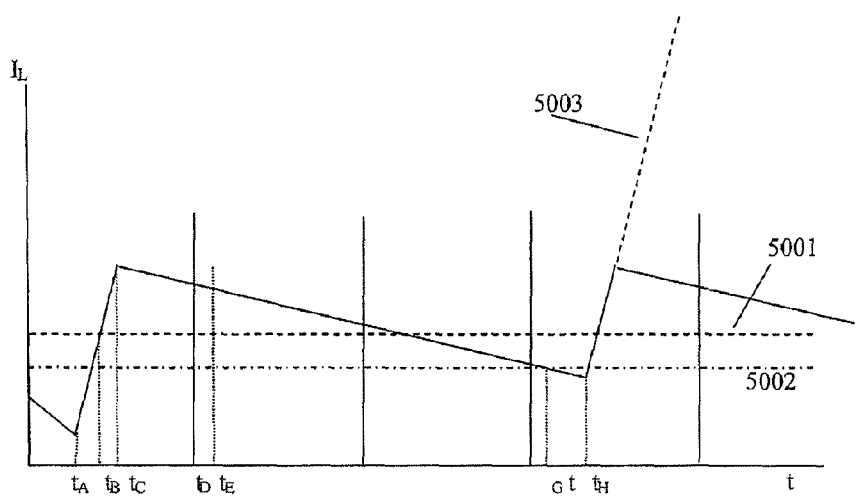
FIG. 5 illustrates operation of an embodiment of current limiting according to the present invention.

FIG. 5 illustrates the operation of the present invention on a converter operating in valley current mode. A peak current limit 5001 is imposed on the inductor current when the PMOS is on and a valley current threshold 5002 is imposed on the inductor current when the PMOS is off. In FIG. 5 the peak current limit 5001 is the same as the current limit 4001 shown in FIG. 4, and the current slopes and comparator propagation delays are illustrated as being the same as in FIG. 4 for ease of comparison. In this embodiment reaching the peak current limit causes the PMOS to turn off and the NMOS to turn on.

Again a short-to-ground situation occurs at a time to which coincides with the PMOS turning on. The current therefore ramps up quickly until at time $t_B$ the peak current limit is reached. Propagation delays, as mentioned above in relation to FIG. 4, mean that the PMOS actually turns off at time $t_C$, which is when the NMOS turns on and the current begins to decrease. At time $t_D$ the next clock pulse is received and at time $t_E$ the PMOS would ordinarily turn on based on the duty cycle controller. However at time $t_E$ the inductor current is above the valley current threshold 5002 and so turn on of the PMOS is inhibited. The inductor current slowly decreases across the remainder of that cycle and, in the illustrated example, the next cycle until at time $t_G$ the valley current threshold is reached. At this point turn on of the PMOS is no longer inhibited. As the short-to-ground situation is continuing, and the duty cycle controller is forced into a high duty cycle, the PMOS turns on very shortly afterwards at time $t_H$. The normal voltage and current control loops may still be operating in the background whilst the PMOS turn on in inhibited and thus there may already be a signal indicating that the PMOS should turn on. Reaching the valley current threshold simply unblocks this pending request so there are only minimal logic/driver delays before the PMOS is turned on. The inductor current therefore ramps quickly again until the current limit is reached and the PMOS is forced off again. This pattern repeats for as long as the short to ground continues.

It can therefore be seen that by using two current thresholds, a peak current threshold which is monitored when the PMOS is on and enforced as a limit, and a valley current limit which is monitored when the PMOS is off and enforced as a threshold, over-current protection can be achieved and the problem of stair-stepping can be avoided.

Monitoring the inductor current against the valley current threshold when the PMOS is off avoids the problem of stair-stepping as the PMOS can never be turned on unless the inductor current has decreased to below the valley current limit threshold. The peak current limit provides current limiting to limit the amount of current increase in any one cycle. Were a valley current threshold to be imposed but without imposing a peak current limit it would be possible for the PMOS to be turned on below the valley current threshold and remain on for most of one cycle (as illustrated by dotted line 5003). Even in one cycle the current could increase to significant levels that could cause damage. Thus the peak current limit provides a limit on the maximum current increase in any one cycle.

In some embodiments, control circuitry may be arranged to detect behaviour indicative of a short-to-ground or other current overload situation, such as the peak current limit being triggered several times in succession and/or the inductor current being above the valley current threshold and remaining above the valley current threshold for several cycles. Additionally or alternatively an under-voltage threshold could be used to detect that the output voltage is below a certain threshold, which may be programmable with, or separate from, the target output voltage. If a short-to-ground situation is detected the control circuitry may disable the converter.

It should be noted that although the valley current threshold limit is illustrated in FIG. 5 as being lower than the peak current threshold the valley current threshold may be set at the same level as the peak current threshold or higher than the peak current threshold. The maximum inductor current that can be reached is determined by the higher of the peak current limit or valley current threshold and the amount of current increase during the propagation delays associated with turning the PMOS off once at or above the peak current limit. The first and second thresholds, i.e. the peak current limit and valley current threshold, can be set accordingly.

It will be appreciated that as used in the specification that terms such as "above" or "below" the threshold relate to the actual inductor current being greater than the actual threshold. The actual comparison with the threshold or limit may be done in various ways. For instance a signal which is inversely related to the inductor current could be compared with a threshold and the signal having a value which is less than the threshold means that the inductor current is above the current limit. Thus the terms "above" and "below" are taken to refer to relative sides of a threshold with "above" meaning that, when translated into the actual current in the inductor, the threshold has been passed (the inductor current is greater than the relevant limit) and the term "below" meaning that the threshold has not be exceeded. It will also be noted that it is possible that the inductor current may be negative for at least part of the cycle and that the valley current limit could be a negative current limit. In terms of inductor current an inductor current which is less negative than a negative current limit (or zero or a positive current) is "above" the threshold. It will also be appreciated that depending on the circuitry used an inductor current exactly equal to the threshold may trigger the same response as a current above or the same response as a current below the threshold. Thus a current equal to the peak current threshold may trigger the PMOS to turn off and the NMOS to turn on. An inhibit signal due to the valley current threshold may be stopped as soon as the inductor current equals the valley current threshold.

The peak current limit and valley current threshold may be notionally fixed during normal operation of the converter, although variations in offset, temperature etc. may result in variations in the actual limits imposed. Alternatively one or both of the peak current limit and valley current threshold may be adjusted in use to provide a different limit in accordance with the operating characteristics of the converter. In normal steady state operation however the peak current limit and valley current limit are both set above the expected peak and valley currents.

In some embodiments the effect of valley current threshold, i.e. inhibiting turn on of the PMOS, may only be implemented in response to the peak current limit being triggered. In one embodiment, where the peak current limit is set at the same level or higher than the valley current threshold, it can be assumed that if the peak current limit is reached and the PMOS is consequently turned off, the current when the NMOS turns on will be greater than the valley current threshold. An inhibit PMOS signal may therefore be asserted (or an inhibit flag status set) which inhibits turn on of the PMOS in response to the peak current limit being reached. The inductor current when the PMOS is off is then measured against the valley current threshold until the valley current threshold is reached, at which point the inhibit signal is discontinued (or the flag status cleared) thus allowing the PMOS to turn on again. In this way the valley current threshold is only used to inhibit turn on of the PMOS following the PMOS being turned off due to reaching the peak current limit.

In other embodiments however the peak current limit and valley current threshold are applied independently in that the PMOS is inhibited from turning on if the current is above the valley current threshold even if the PMOS was turned off as part of the normal control mode and not as the result of the peak current limit being reached. This avoids a fault condition occurring where if the PMOS is turned on for a very short time, in normal control mode, the peak limit detection circuitry may not have time to trigger. In such a case the current when the PMOS is turned on may be above the peak current limit but as the PMOS has such a small conduction period the peak current limit is not triggered. Even such a short conduction time can lead to the current increasing cycle on cycle to unacceptably high levels. By ensuring that the PMOS turn on is inhibited if the inductor current is above the valley current threshold such high current situations are avoided even when the peak current limit isn't triggered.

The current in the inductor whilst the PMOS is on is preferably determined by measuring the electrical characteristics of the PMOS switch when turned on. As mentioned above the source drain voltage of the PMOS is proportional to the current flow in the PMOS, and hence the inductor, when turned on. The current in the inductor when the PMOS is off is preferably determined by measuring the electrical characteristics of the NMOS switch, i.e. the source drain voltage of the NMOS. Thus the present invention applies a lossless technique to determine the current in the inductor.

Most DC-DC converters, at relatively high current loads, operate in Continuous Conduction Mode (CCM) where there is always current flowing in the inductor and one of the PMOS and the NMOS is always on for part of the cycle (ignoring a very short time in a switching step where the turn off of one switch is staggered from the turn on of the other switch to avoid creating a direct path from $V_{in}$ to ground). Thus by monitoring the PMOS when the PMOS is on and the NMOS when the NMOS is on the current in the inductor is effectively always monitored. Some DC-DC converters are also operable in a mode called Discontinuous Conduction Mode (DCM) where the NMOS is turned off prior to the PMOS turning on to prevent the current in the inductor from going substantially negative. Negative current flow in the inductor effectively discharges charge from the output to ground and thus lowers the efficiency of the converter at low current demand.

In a short-to-ground situation the current demand would appear to increase and thus it is likely that the converter would start operating in CCM and thus the current in the inductor could be monitored through the whole of each cycle by monitoring the current through the PMOS and/or through the NMOS. However were a low current limit to be imposed such that the converter would be operating in a DCM regime it will be appreciated that when the NMOS is turned off the current information is effectively lost.

If there is still a current in the inductor at the time that the NMOS turns off the current will flow through a parallel path such as a parasitic body diode associated with this NMOS. As mentioned above a NMOS transistor switch will generally have an inherent parasitic drain-bulk diode associated with it. When the NMOS is turned on this diode is shunted to ground. However if the NMOS device turns off while there is still a current flowing from ground to the drain node this parasitic diode may turn on and allow current to flow until the inductor current reaches zero. Once the inductor current reaches zero the diode will turn off, it won't conduct a reverse current.

In some embodiments a separate diode (or other unidirectional current device) could be specifically provided in parallel with the low side switch 20 to control current flow when the low side switch is off. This separate diode could be arranged to allow forward current to flow if the low side switch is turned off (before the PMOS is turned on) but to prevent current reversal in the inductor. Any suitable diode, such as a low drop diode or Schottky diode could be used.

In any case however any current flow that occurs through a parallel path when the NMOS is turned off can't be determined by monitoring the source-drain voltage of the NMOS.

In DCM the NMOS is turned off at close to zero inductor current. Thus for the purposes of applying a current limit the turn off of the NMOS may effectively be taken as an indication of zero current. Additionally or alternatively the valley current threshold may be set no lower than the threshold at which the NMOS is turned off so that the valley current threshold is always reached before the NMOS is turned off. In this way monitoring the NMOS when it is turned on is sufficient to allow detection of when the valley current threshold is reached.

Figure 2:
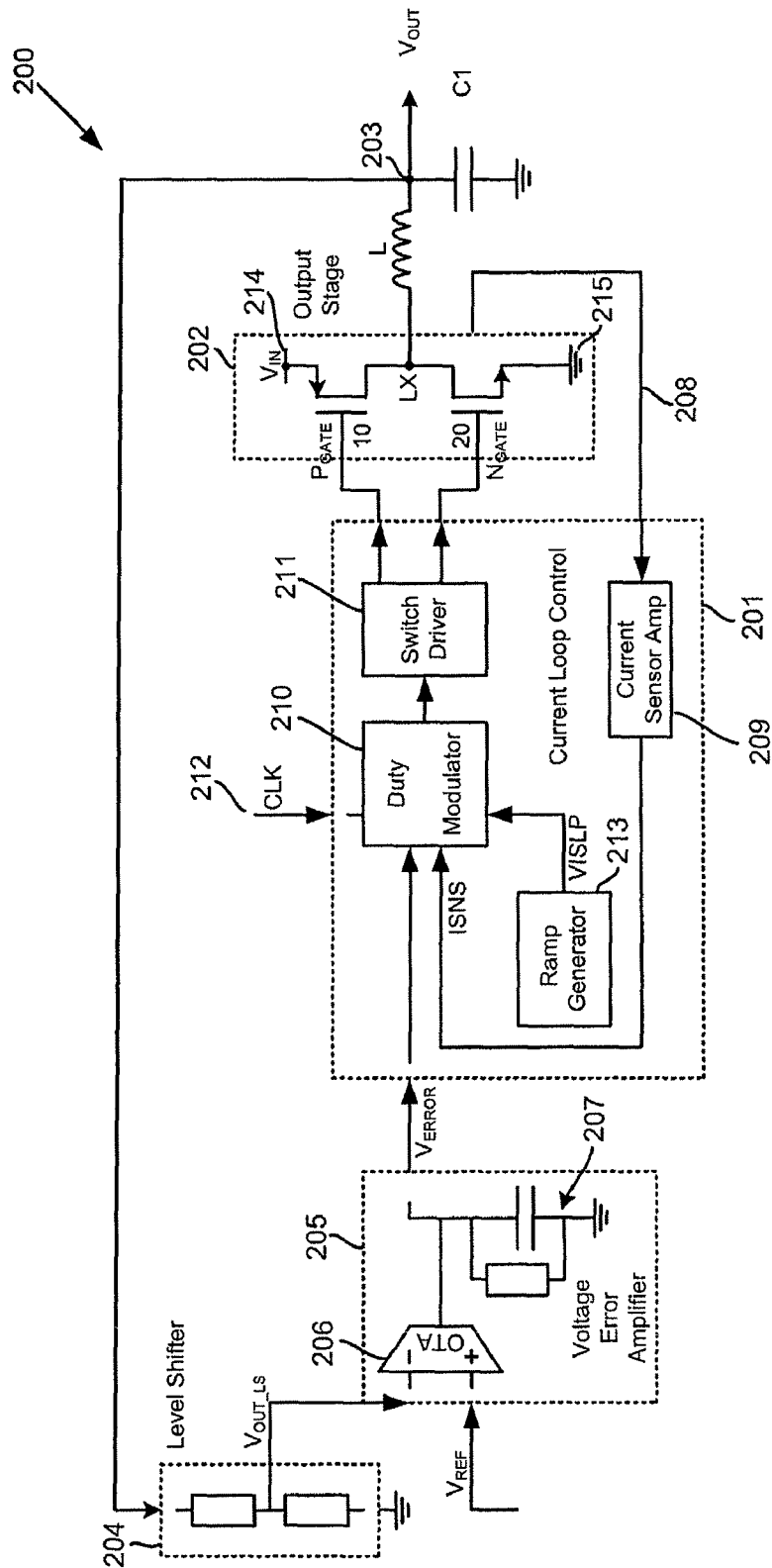
FIG. 2 illustrates a conventional DC-DC converter.
Figure 6:
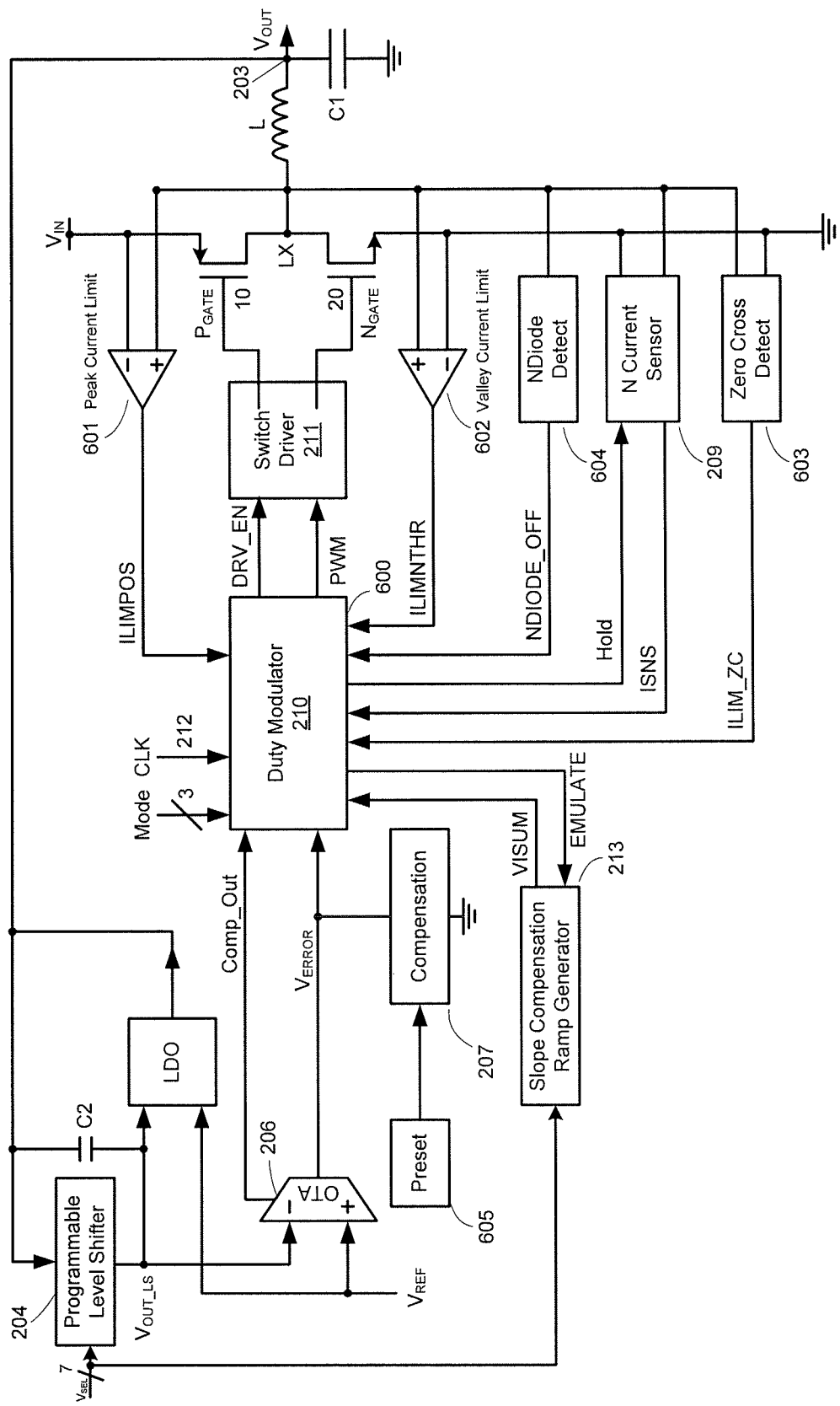
FIG. 6 shows an embodiment of a DC-DC converter according to the present invention.

FIG. 6 shows a DC-DC converter circuit according to an embodiment of the present invention. Similar elements to those shown in FIG. 2 are referred to by the same reference numerals.

For instance, in a similar arrangement as described above in the relation to FIG. 2, the converter shown in FIG. 6 has a PMOS switch 10 and an NMOS switch 20 connected either side of node LX. A voltage feedback loop from output node 203 feeds back via a programmable level shifter 204 to an error amplifier 206 to provide a voltage error signal $V_{ERROR}$ to the duty modulator 210. A current sense circuit 209 provides a current sense signal ISNS to the duty modulator which also receives a slope compensation signal from slope compensation ramp generator 213.

The duty modulator 210 receives these signals and a clock signal 212 derives a pulse width modulation signal PWM to drive the switch driver 211 to operate the PMOS and NMOS.

In the circuit shown in FIG. 6 the current sense circuit is arranged to monitor the source-drain voltage of the NMOS when the NMOS is turned on. Hence the circuit shown in FIG. 6 uses the lossless current sensing approach and is operable in Valley Current Mode. As the skilled person will appreciate, in Valley Current Mode the PMOS is turned off and the NMOS is turned on in response to a clock signal and the comparison of ISNS with $V_{ERROR}$ (including slope compensation signal VISLP) determines when, in a cycle, the PMOS turns on.

FIG. 6 also comprises peak current limit monitoring circuit 601 and a valley current threshold monitoring circuit 602. The peak current limit circuit may be implemented by a simple comparator comparing the PMOS drain-source voltage with programmed voltage thresholds (as shown in FIG. 6) or may alternatively use a current sense amplifier followed by a current comparator or a resistor and voltage comparator. Likewise the valley current threshold monitor may comprise a simple comparator comparing the NMOS drain-source voltage with an appropriate limit as shown but other arrangements such as current sense amplifiers could be implemented. The current sense amplifier could be used to derive the current sense signal ISNS and a signal to be used for monitoring the valley current threshold but in some embodiments it is preferred to have separate monitoring circuitry for the valley current threshold as shown.

In operation, the peak current limit circuitry monitors the source-drain voltage of the PMOS (when turned on), which is proportional to the current flowing through the PMOS, with an appropriate voltage level. If the source drain voltage crosses the voltage threshold this indicates that the current through the PMOS, and hence the inductor, has reached the current limit. At this point the output of the comparator, ILIMPOS, changes from low to high (or vice versa) and the duty modulator acts to turn PMOS switch 10 off and turn NMOS switch 20 on.

The valley current threshold circuitry acts in a similar fashion comparing the NMOS source drain voltage (when turned on) with an appropriate voltage threshold and generating an output signal, ILIMNTHR, which indicates whether the current flow is above or below the relevant threshold. The duty cycle modulator 210 receives the ILIMNTHR signal from the valley current threshold circuitry and, during any period when the signal indicates that the inductor current is greater than the threshold, does not turn the PMOS on.

Although FIG. 6 shows a valley current mode DC-DC converter it will be appreciated that the current limiting described above could be implemented just as easily in a converter operating in peak current mode. As illustrated in FIG. 6 the current limiting circuitry may be separate from any current sense circuitry and as both the PMOS and NMOS currents are monitored the mode of control in normal operation has no impact on the current limiting arrangement.

As mentioned above however Valley Current Mode converters can be particularly advantageous in situations where low output voltages are required because the control over the valley current makes low duty cycles easier to achieve. In such VCM converters it can be advantageous to operate in DCM, where the NMOS is turned off, to prevent substantial negative current, before the PMOS is turned on. The embodiment shown in FIG. 6 thus has zero cross detect circuitry 603 for monitoring the source drain voltage of the NMOS and, when it reaches a threshold Iped, generating a signal ILIM_ZC to cause the duty modulator 210 to turn the NMOS off. The threshold Iped is set at such a level so that the inductor current does not go negative, allowing for voltage offsets and propagation delays. The NMOS will therefore usually turn off at some small positive current. As mentioned above this current will then flow through a parasitic diode until the current decays to zero at which point the parasitic diode will stop conducting and the current in the inductor will remain at zero until the PMOS is turned on.

To allow for current loop control when the NMOS is off the converter embodiment shown in FIG. 6 emulates the inductor current when the NMOS is off. The current is emulated by holding, when the NMOS is off, the output of the current sense amplifier 209 at the value it was at just prior to the NMOS turning off and also emulating the change in inductor current by adding an additional slope to the ramp generated by the slope compensation ramp generator 213. The duty modulator, in response to the signal ILIM_ZC indicating that the inductor current has reached the Iped threshold level, therefore generates a hold signal which causes the current sense amplifier 209 to hold its current output value and an emulate signal which causes the ramp generated by the slope compensation circuit to include an additional slope component. This additional slope emulates the change in inductor current during the period of conduction through a parallel path such as the body diode of the NMOS. The additional slope is therefore applied until the inductor current reaches zero, which is measured by NDiode detect circuit 604 detecting when the voltage at node LX crosses a threshold. When the NMOS is turned on and is conducting the voltage of node LX will be near ground. When the NMOS is turned off but current is flowing through the parasitic diode of the NMOS the voltage at node LX will drop to a diode voltage below ground. Once the inductor current reaches zero however the node LX will fly high and thus the voltage at node LX crossing zero say can be used to determine that the inductor current has reached zero. At this point therefore the emulate signal is stopped and the slope of the ramp generated by the slope compensation signal returns to the slope necessary for slope compensation.

Figure 11:
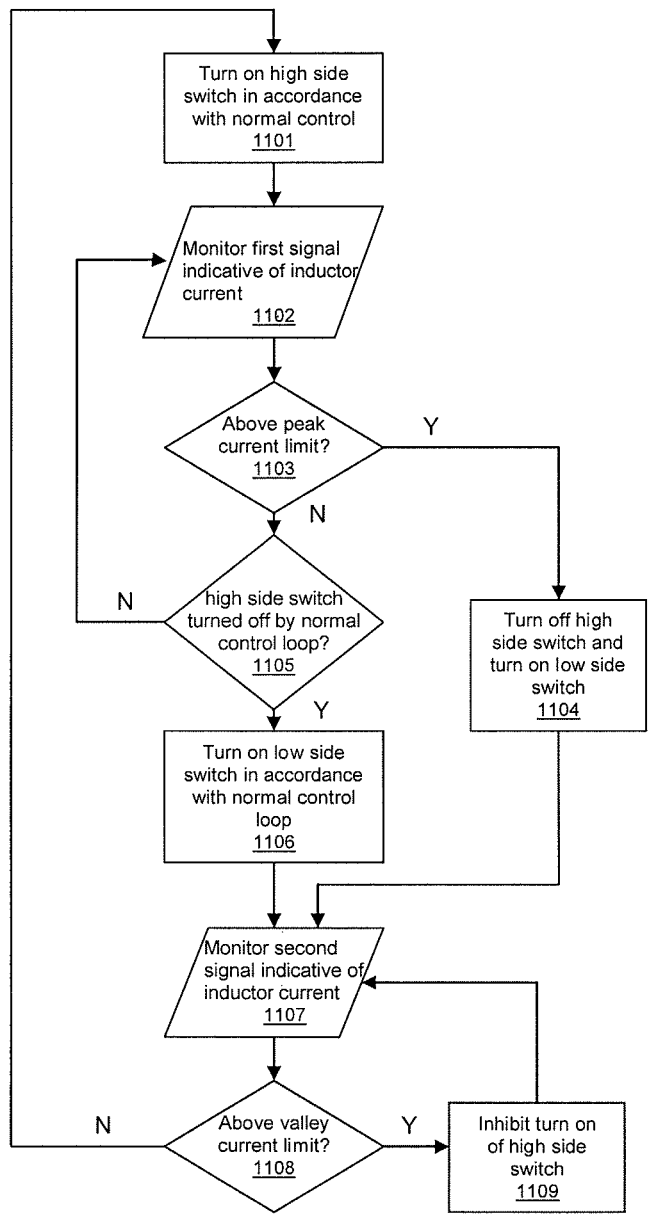
FIG. 11 is a flow chart illustrating the steps of current limiting according to an embodiment of the invention.

FIG. 11 shows a flowchart illustrating the general steps of current limiting in accordance with an embodiment of the invention. For ease of explanation the flowchart starts with turn on 1101 of the high side switch, i.e. PMOS 10. The high side switch is turned on in accordance with normal control mode of the converter, for instance in a peak mode converter the turn on of the high side switch may be in response to a clock edge and in a valley mode converter the high side switch may be turned on by voltage and current control loops. When the high side switch is turned on a first signal indicative of the inductor current, e.g. a signal derived from the source-drain voltage of the PMOS, is monitored 1102. The first signal is compared 1103 with the peak current limit. If the first signal exceeds the first current limit at any time the high side switch is turned off 1104 and the low side switch, e.g. NMOS 20, is turned on. At this point a second signal indicative of the inductor current, e.g. the source-drain voltage of the NMOS, is monitored 1107.

If the peak current limit is not exceeded however at some point the normal control will turn the PMOS off 1105, i.e. the inductor current will have reached the $V_{ERROR}$ threshold in a peak converter or the next clock edge will be received in a valley mode converter. The normal control loop will then proceed to turn the low side switch on 1106 and, in which case, the second signal indicative of the inductor current will again be monitored.

The second signal is compared to the valley current threshold 1108. If the second signal is above the valley current threshold, and for as long as it remains above the threshold the turn on of the high side switch is inhibited 1109. Once the valley current threshold is reached however the high side switch may be turned on again in accordance with normal control 1101.

The current limiting of the present invention can be used in a novel start-up mode for a DC-DC converter, especially a VCM DC-DC converter such as shown in FIG. 6.

One of the biggest technical challenges with a Valley Current Mode DC-DC converter is how to start it up in a way that prevents excessive output voltage overshoot (due to reset wind-up on start-up), minimizes in-rush current (since the PMOS current is only indirectly controlled), and still allows start-up into full load (so the current can't just be limited to a "safe" value below the normal current limit).

An advantageous start-up mode of a DC-DC converter may use two current thresholds in a similar fashion as described above, i.e. a first threshold is a peak current limit and a second threshold is a valley current threshold. In this start-up mode the voltage loop of the DC-DC converter is effectively ignored and the driver stage is controlled using a current loop until the output voltage $V_{OUT}$ has reached a set voltage threshold Vth. The current delivered is increased with time during the start-up mode.

By implementing a series of low peak current limits during the start-up period the maximum current, and thus average current, can be controlled thus providing control over inrush current which tends to result in less overshoot due to less current demand. Further, if the $V_{ERROR}$ signal line is pre-charged during start-up, to a voltage value which is close to the expected operating value, the start-up method can also reduce voltage overshoot.

The peak current limit may be increased in various ways but in a convenient embodiment the peak current limit is increased in a number of steps. This means that the difference between inductor current and load current can only be less than or equal to the size of the step during the start-up sequence. At the end of the start-up sequence the current in the inductor will be close to the required load current so the inductor current doesn't have far to move to reach regulation and overshoots are minimized.

The increasing output current may conveniently be implemented by using two current limits that are changed throughout the start-up sequence: the first is a peak PMOS current limit used to accurately limit the maximum input current even if the system were to go sub-harmonic; the second current limit is a valley NMOS current limit, used to improve the control of the average output current.

The regulator can be supplied with a clock as normal during start-up. During the start-up mode clock edges of the clock signal are used to determine when to turn the PMOS on. In a peak current mode converter the clock signal controls the turn on of the PMOS in normal operation and hence the start-up mode uses the same general mode of control but, instead of turning the PMOS off using the voltage loop, only a current loop is used. In a valley current mode converter however in normal operation the clock signal controls turn on of the NMOS. Thus this start-up mode of operation provides a start-up procedure which is significantly different to the normal operation.

If a valley current mode converter is started using normal VCM control without any current limiting the NMOS will, in the first cycle, turn off fairly quickly and the PMOS will remain on for the rest of the cycle. This behaviour will be repeated over several cycles as the output voltage slowly increases and the inductor current will grow rapidly leading to a large in-rush current and voltage overshoot. Similar behaviour will occur in a peak current mode converter which is unlimited: during start-up the output voltage will initially be low and thus the duty cycle will be high. In many ways the conditions at start-up are similar to the conditions that prevail in a short-to-ground situation and the present inventors have realised that the same techniques can be used to provide effective current limiting in a start-up mode and also in steady state operation.

As mentioned, in the novel start-up mode, the PMOS is turned on in response to an appropriate edge of a clock pulse. In each cycle of operation, the current control turns off the PMOS (and turns on the NMOS) when the PMOS current reaches the peak current limit threshold IPLIMIT then in force. The NMOS then turns off at the next clock edge unless the NMOS current has not yet fallen to the valley current threshold IVLIMIT then in force, in which case the PMOS is not turned on until after the NMOS current has fallen to IVLIMIT. Thus the peak current limit is used to control when the PMOS turns off and the NMOS turns on. This limits the amount of current increase in any cycle. Preventing the PMOS from turning on if the inductor current has not decreased to below the valley current threshold prevents the inductor current from increasing too rapidly and provides control over the average current.

As described above the PMOS is preferably turned on at most once in any cycle. Thus, if the PMOS is turned off (because the peak current limit is reached) and the inductor current then drops to the valley current threshold before the end of the cycle, the PMOS remains off until the start of the next cycle. At which point the relevant clock edge will turn the PMOS on again.

In a first mode of operation the turn on of the PMOS is always synchronised to a clock edge. In other words the PMOS only turns on at a clock edge following the inductor current reaching the valley current threshold. Thus the PMOS is turned on at the beginning of one cycle and maintained on until the peak current limit it reached. At this point the PMOS is turned off and the NMOS is turned on. The inductor current then decays until the valley current threshold is reached, which may be one or more cycles later. The PMOS is only turned back on at the next relevant clock edge.

In a second mode of operation the PMOS is turned on as soon as the valley current threshold is reached (preferably subject to the requirement that the PMOS be turned on at most once in a cycle). Thus if the PMOS is turned off and the inductor current then drops to below the valley current threshold in the same cycle, the PMOS is turned on at the next clock edge. However if the inductor current only reaches the valley current threshold in a subsequent cycle the PMOS is turned on as soon as the valley current threshold is reached, i.e. at whatever time in the cycle.

In the first mode of operation the turn on of the PMOS only ever happens at a clock edge. This can lead to a reduced frequency of operation as the converter will wait for a clock edge to turn the PMOS on. This does result in an increased ripple in the output as compared with the second mode of operation, although the second mode of operation does not have the consistent PMOS turn on at the clock edge.

The start-up scheme may operate using either the first mode of operation or the second mode of operation. In one embodiment one mode of operation may be used for one or more periods during the start-up scheme and the other mode of operation may be used during the rest of the start-up period.

During the initial part of the start-up mode the current in the inductor may be low and, especially if the PMOS is only ever turned on at a clock edge, there may be periods where if the NMOS was kept turned on the inductor current would reverse. Thus the NMOS may be turned off if the current is near zero to avoid the NMOS current reversing and discharging the load. Various arrangements for turning the NMOS off to prevent a negative current exist. For example in the converter shown in FIG. 6 the same zero cross detect circuitry 603 as described above may be used to turn the NMOS off, with a threshold of Iped to guarantee no reverse current despite offsets and propagation delays.

As mentioned above there will be a minimum on-time for the PMOS, due to propagation delays in the comparator and PMOS pre-driver, so the PMOS current may overshoot somewhat. However this minimum time is short compared to the clock frequency, so the overshoot will be small.

By controlling turn on of the PMOS in response to the clock signal, and turning the NMOS off to prevent negative current, the start-up mode of operation can operate at a constant frequency. This constant frequency may be the same frequency as the converter will operate at in normal operation and may include a small amount of frequency dither. This start-up mode therefore provides a constant frequency start up mode. Constant frequency operation reduces the chance of interference with other device functions as the frequency of operation of the converter is known in advance and can be accounted for in device design. Further, the time at which the PMOS will turn on in the cycle is known which allows the timing of other functions of the device to be set accordingly, for instance the device designer may wish to avoid sensitive detections/decisions within the device from occurring when the PMOS switches on.

It will of course be appreciated that the converter may be operable at more than one constant frequency which may be selectable depending on the operating conditions. It will also be appreciated that the use of dither, as is well known in the art, provides a controlled change in frequency and hence the term constant frequency should be taken to include a notional constant frequency to which a known amount of dither is applied. It will further be appreciated that in use the actual switching frequency during at least part of the start-up process may be lower than the constant frequency. If the time taken for the inductor current to decay from the peak current limit to the valley current threshold is greater than the duration of a cycle the PMOS will not turn on every cycle. By constant frequency is meant a constant maximum frequency, i.e. that turn on is occurs at most once per cycle and is synchronised to a clock edge.

The peak current limit and valley current threshold are increased over time during the start-up procedure so that the current delivered to the load, and hence the output voltage, increase. The peak current limit may be increased in a series of steps. The valley current threshold may also be increased in a number of steps although the two thresholds do not need to be increased at the same time and, at any time, one threshold may be increased whilst the other is maintained at its present level.

The current threshold may be increased at set times during the start-up procedure, for instance the increases may occur a set number of cycles into the start-up. Alternatively a series of output voltage thresholds may be used with each output voltage threshold being reached triggering an increase in the current threshold. At least some current thresholds used during start up may be fixed thresholds or at least some of the current threshold may be determined based on $V_{IN}$ and target $V_{OUT}$. One or both of the peak current limit and the valley current threshold could also be continually increased over time, for example as a ramp over time.

Once $V_{OUT}$ reaches a certain output voltage threshold, Vth, the normal control loop is activated instead of the above start-up modality and the converter transitions to normal control. The output voltage threshold at which the start up mode ends may be fixed or may be variable depending on the target output voltage, as determined by the voltage select signal $V_{SEL}$ and/or the input voltage $V_{IN}$.

In normal mode of control the voltage error loop is activated and used in determining the appropriate duty cycle of the modulator. It will be appreciated that if the normal mode of operation is a Valley Current Mode of operation the transition from start-up mode to normal mode also involves changing from the PMOS being turned on in response to the clock signal to the NMOS being turned on by the clock signal.

As mentioned above, during the initial start-up, the error amplifier output $V_{ERROR}$ is preferably pre-biased to near its eventual normal mode voltage. For example, as shown in FIG. 6 a preset circuit 605 may bias a compensation means 606 to provide a pre-bias voltage on the $V_{ERROR}$ signal line. This avoids any large transient when transitioning from start-up mode to the normal voltage and current loop control, due to the voltage error amplifier having been slewed over into maximum voltage while $V_{OUT}$ was ramping up from zero. Once $V_{OUT}$ reaches Vth, the pre-bias is shut off and the normal loop should take over without any large transient. Control circuitry may flag this status to outside the regulator. Suitable circuitry for providing an accurate pre-biasing of the $V_{ERROR}$ signal line is described in our co-pending patent application (our ref: P113611GB00/P1236GB00 Preset).

The current limiting applied during start-up mode also provides protection against a short-to-ground during start-up. Under a short to ground condition the peak inductor current will be constrained since the P-channel power switch can never turn on until the inductor current has reached the valley current limit first. Even if the output is exactly zero volts, the system will take as long as is necessary to recirculate the inductor current in order to reach the valley current limit before turning on the P-channel power switch again.

If $V_{OUT}$ does not traverse the output voltage threshold Vth within a given time during initial start-up, the system may determine that there has been a short to ground and the DC-DC will be shut off. Control circuitry may be arranged to attempt to start the converter again after a short time-out. If the converter is shut off because of an inferred short-to-ground, control circuitry may flag this status to outside the regulator.

Figure 7:
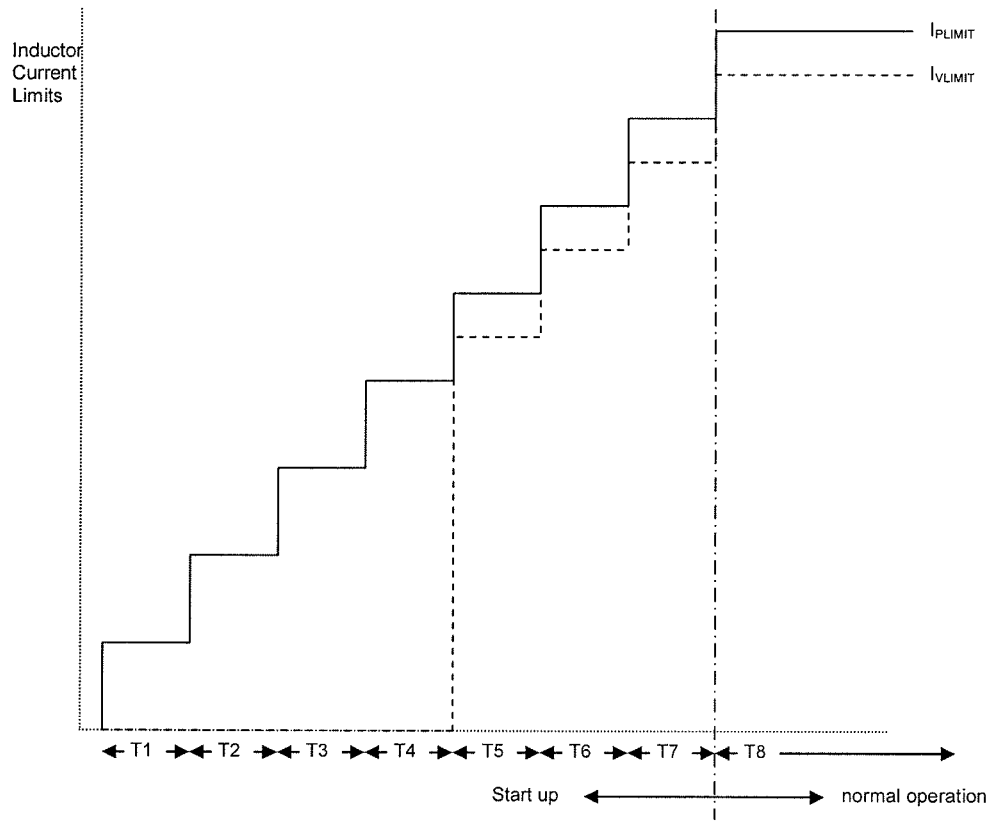
FIG. 7 shows an example of current limits that may be applied during a start-up mode of operation.

FIG. 7 shows the current profile during start-up mode for one embodiment, in which eight peak current limit (IPLIMIT) levels are used. Clearly, a greater or lesser number is possible. The first four levels follow a pre-determined pattern that is independent of input and output voltage selected. The final four levels are programmed versus input and output voltage according to a prediction of how much ripple current is expected, possibly using a look-up table.

The valley current limit IVLIMIT is adjusted over time with up to the same number of current limit steps as the peak currents. The illustrated embodiment uses zero for IVLIMIT for the first four levels, the remainder tracking the peak current limits IPLIMIT to maintain a constant difference. Other embodiments may not maintain this difference constant.

In this embodiment in the first four time slots (i.e. the periods in which the first four current limits are used) the converter is operated in the first mode mentioned above so that the PMOS is always turned on in synchronisation with a clock edge. In the next four time slots the converter is operated in the second mode of operation, i.e., the P-channel power switch, 10, is turned back on at the later of the inductor current traversing the lower current limit IVLIMIT and the next clock edge, i.e. the clock edge following the PMOS being turned off. For all time slots, once turned on, the P-channel power switch stays on until the peak current limit IPLIMIT is reached.

By judicious setting of the peak and valley current limits, a maximum average current value for each particular time-slot can be set, given by (IVLIMIT+IPLIMIT)/2; since this value increases each time-slot, the overall maximum average output current during each time-slot during the upper reaches of the start-up sequence is increased in a monotonic fashion up to its normal operating limit.

Figure 12A:
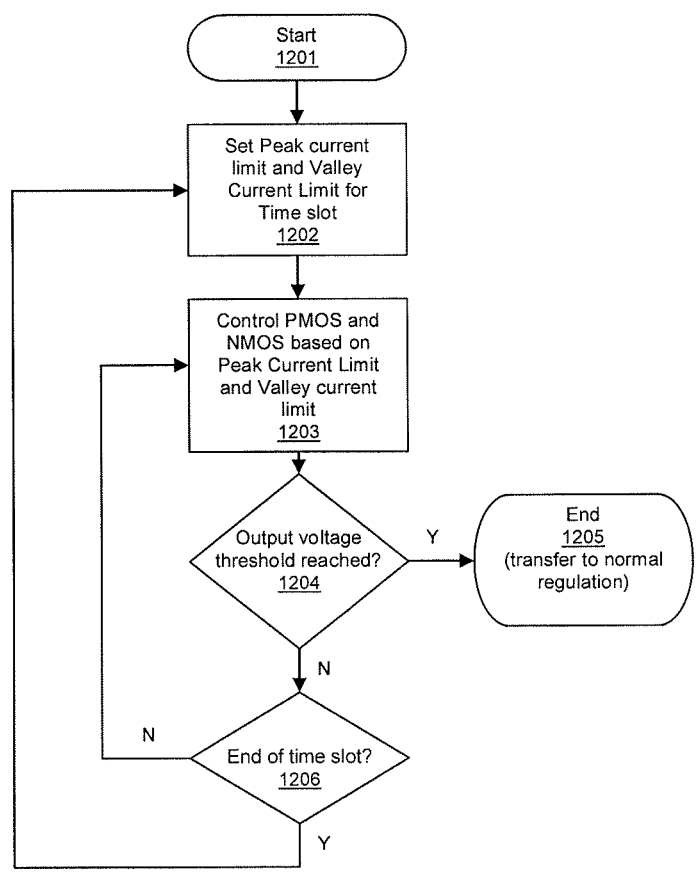
FIG. 12a is a flow chart illustrating the general steps in a start-up mode of operation according to an embodiment of the invention.

FIG. 12a illustrates the basic steps of the start-up mode of operation according to this aspect of the invention. The process starts 1201 and the peak current limit and Valley current limit for the current time slot are set 1202. Initially the timeslot is timeslot T1. The start-up mode controls 1202 the switching of the PMOS and the NMOS based on the peak current limit and valley current limit as will be described with reference to FIG. 12b. If, at any time, the output voltage threshold Vth is reached 1204 the start-up mode ends 1205 and the converter transitions to normal regulation. Otherwise the switching control is maintained to the end of the time slot 1206 (which may be based on output voltage or duration for example) at which point the appropriate peak current limit and valley current threshold for the next timeslot are set and the process repeats.

Figure 12B:
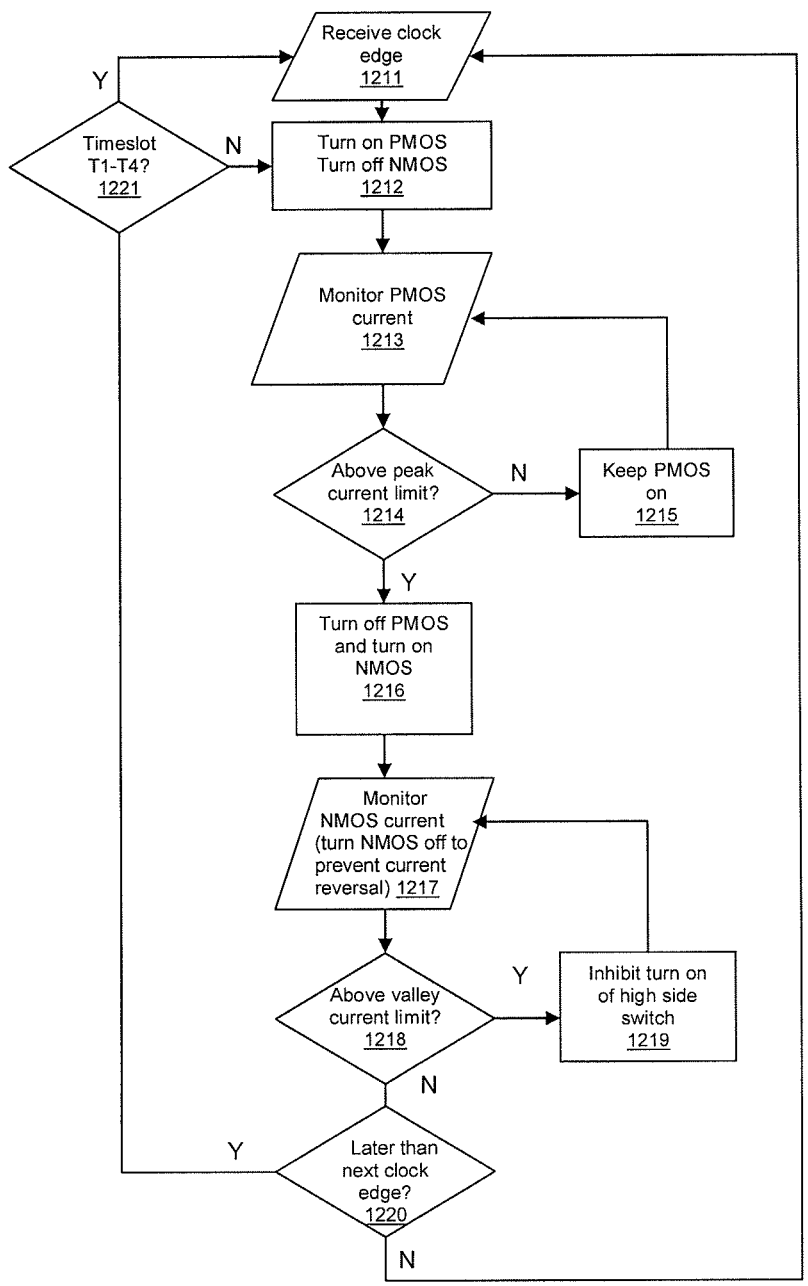

FIG. 12b shows the switching control process. In response to receipt 1211 of a clock pulse the PMOS is turned on at step 1212. The PMOS current is then monitored 1213 (by monitoring a signal derived from the source drain voltage of the PMOS). If the current is below the peak current limit (as determined at step 1214) the PMOS is kept on 1215. However as soon as the peak current limit is reached the PMOS is turned off and the NMOS is turned on at step 1216. At step 1217 the NMOS current is monitored and, if the NMOS current is detected as being very near zero the NMOS is turned off. At step 1218 the NMOS current is compared to the valley current threshold. If above the threshold the PMOS is kept off 1219. If however the inductor current has reached the valley current threshold the process moves to step 1220. If it is not later than the next clock edge, i.e. there has not been another relevant clock edge since the PMOS was turned on, flow proceeds to wait for the next clock edge at step 1201. However if there has been at least one relevant intervening clock edge the process varies depending on the timeslot 1221. For timeslots T1 to T4 the process waits for the next clock edge to turn the PMOS on (and turn the NMOS off if not already off). However in timeslots T5-T8 the PMOS is turned on, and the NMOS turned off, as soon as the valley current threshold is reached.

Figure 8:
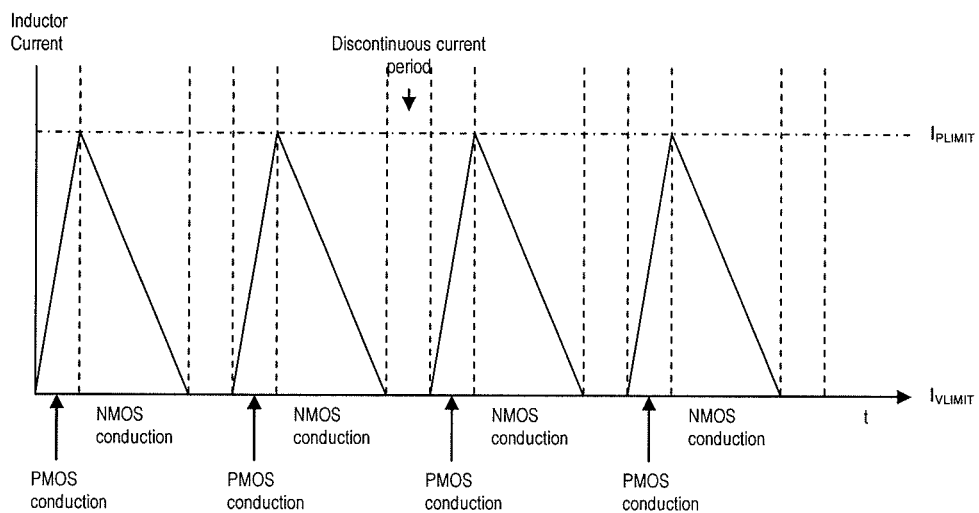
FIG. 8 illustrates the inductor current waveforms during a first part of a start-up mode of operation using the current limits shown in FIG. 7.

FIG. 8 shows typical current waveforms characteristic of timeslots T1 to T4 (i.e. with IVLIMIT=0) if the undervoltage threshold Vth has not been traversed. The inductor current can be seen to charge from zero up to the peak current limit, $I_{PLIMIT}$, discharge to zero, go discontinuous i.e. zero current), then charge again. The inductor current is prevented from going negative by the NMOS turning off when the current nears zero. It will be clear that in this embodiment, as the inductor is prevented from going negative and the valley current threshold is set at zero (or effectively at the threshold for turning the NMOS off to prevent current reversal), turn on of the PMOS is only inhibited if the inductor current is above the threshold, i.e. an inductor current equal to the threshold means that turn on of the PMOS is no longer inhibited.

During timeslots T1 to T4, the turn on of the P-channel power switch is synchronized to a clock edge. That is the PMOS is only turned on at the next clock edge following the inductor current reaching zero. This means that the inductor current is typically discontinuous, i.e. there are periods of zero inductor current. This ensures that the maximum average inductor current—achieved in the case where the inductor current becomes just continuous, i.e. boundary condition CCM—is $I_{PLIMIT}/2$.

In operation the PMOS turns on at a clock edge and remains on until the peak current limit $I_{PLIMIT}$ is reached. Current decay in the NMOS conduction period may be slow enough that the current has not decreased to zero before the next clock edge. Were the PMOS to turn back on at this clock edge, the current would increase further during the next cycle. As discussed previously, there may be an inherent minimum pulse width associated with the PMOS turn-on, so despite the peak current limit, the current could staircase upwards, as described above.

However the control scheme is such that the PMOS is not turned on at this clock edge, but only at a clock edge after the current has reached the valley current threshold, possibly after multiple cycles.

This scenario is most possible initially, since Vout is small, so the decay slope will be much smaller than the rising slope of (Vin−Vout)/L~Vin/L.>>Vout/L.

Figure 9:
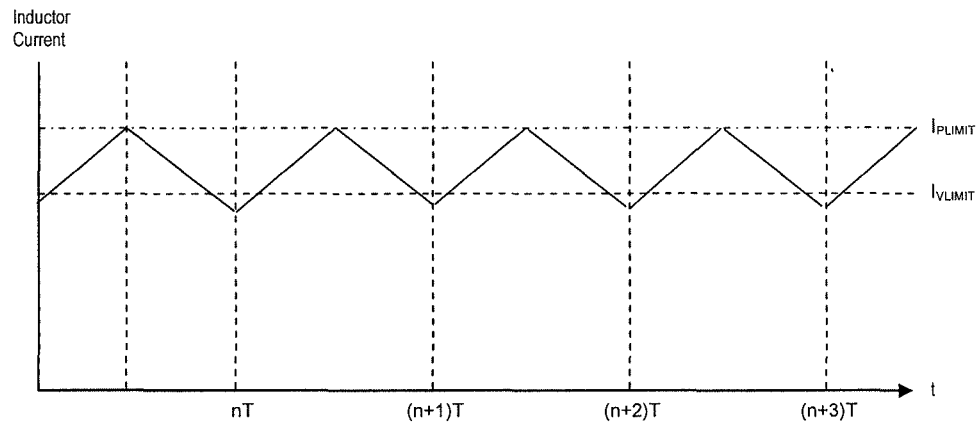
FIG. 9 shows inductor current waveforms during a second part of a start-up mode of operation using the current limits shown in FIG. 7, in which the duty cycle is less than 50%.
Figure 10:
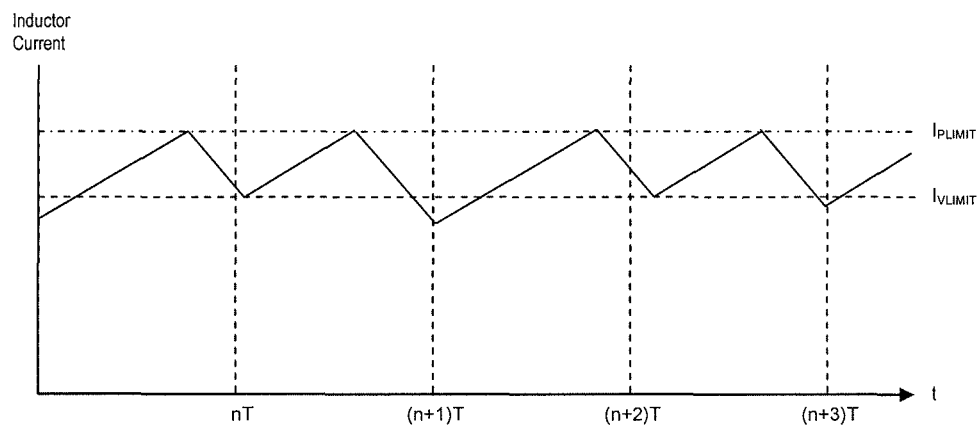
FIG. 10 shows inductor current waveforms during a second part of a start-up mode of operation using the current limits shown in FIG. 7, in which the duty cycle is greater than 50%.

As described above propagation delays and the like may mean that the PMOS actually only turns off a short time after the relevant threshold is reached. This time delay is omitted from FIG. 8 and also from FIGS. 9 and 10 for the purposes of clarity. Similarly, when the NMOS actually turns off it is likely there will still be some current flowing and this will flow through a parallel path such as a parasitic body diode associated with the NMOS. During the period of conduction through the parasitic body diode the slope of the inductor current will change but FIGS. 8 to 10 show a constant slope for clarity. The change in slope does not effect operation of this start-up scheme. As mentioned above turning the NMOS off may be taken as an indication that the inductor current is zero for the purposes of this start up scheme.

As mentioned above, in this embodiment of the start-up mode of operation, during timeslots T1 to T4 the turn on of the PMOS is always synchronised to a clock edge. In time slots T5 to T8 however the PMOS turns on at the later of the next clock pulse and the inductor current reaching the valley current threshold.

FIG. 9 shows typical current waveforms characteristic of timeslots T5 to T8 if the undervoltage threshold has not been traversed and the P-channel power switch conduction duty cycle is less than 50%, with the inductor current decreasing to the valley current limit $I_{VLIMIT}$ before the end of each cycle.

The inductor current can be seen to charge from the valley current threshold, $I_{VLIMIT}$, or lower, up to the peak current limit, $I_{VLIMIT}$, then discharge again. The current does now fall under the $I_{VLIMIT}$ value in force in the timeslot, but the NMOS is not turned off. If the current does happen to reach zero at any point, the N-channel power switch will shut off as before.

FIG. 9 illustrates the situation where the inductor current reaches the valley current limit in the same cycle as the PMOS turns off. Thus the PMOS is only turned on at the next edge clock. It will be appreciated however that if the current does not reach the lower limit $I_{VLIMIT}$ by the end of the cycle, the PMOS will be turned on in a subsequent cycle as soon as the inductor current has fallen to less than $I_{VLIMIT}$.

This is shown in FIG. 10 which shows typical current waveforms characteristic of timeslots T5 to T8 if the undervoltage threshold has not been traversed and the P-channel power switch conduction duty cycle is greater than 50%.

The inductor current can be seen to charge from the valley current threshold, $I_{VLIMIT}$, or lower, up to the peak current limit, $I_{PLIMIT}$, then discharge again.

Only some of the P-channel power switch conduction periods are coincident with the clock edge as in some cases the current in the inductor only reaches the valley current threshold part of the way into a subsequent cycle. The subharmonic current behaviour is generally not important since it is normally more important to limit output current than to have it spectrally pure in a fault condition. The start-up mode of operation is implemented to limit the maximum current supplied during the start-up phase. Sub-harmonic behaviour tends to lower the average output current and thus does not represent a problem during start-up.

If the current happens to reach zero at any point, the N-channel power switch will shut off as before.

Note even in start-up, there is a strong motivation and advantage in having the PMOS turn on at a fixed frequency, thus avoiding unpredictable interference with other components in the overall system, rather than having an asynchronous hysteretic mode with widely varying switching frequency during and even after initial start-up.

Other merits of this methodology are that it makes use of largely existing circuitry and gives excellent control while still allowing for early termination of the sequence if the load current is light (i.e. Vth will be hit maybe even during T1 if no current load and output capacitor not very big) (cf schemes that ramp up Vref slowly on power-up, regardless of load (these could still suffer from reset wind-up))

While described in a sequence of discrete steps, this method could also be adapted for using ramped rather than staircase current limits using appropriately designed ramp generation circuitry. The skilled person would be well aware of how to design such ramp circuitry.

The start-up mode according to this embodiment of the invention may be applied to a peak current mode converter or a valley current mode converter. The current limiting may be applied only during start-up mode or a converter which has such a start up mode may also use peak current and valley current limits in normal operation to provide short-to-ground/over-current protection as described previously. In this instance once the converter leaves start-up mode and transfers to normal operation the peak current limit and valley current threshold may be re-set to appropriate limits for current limit protection in normal operation.

Thus, once in normal mode of operation, the PMOS peak current limit sensor remains active and, if triggered, turns on the NMOS to ramp down the current. Further the PMOS is inhibited from turning on again until after the NMOS current has reduced below $I_{VLIMIT}$. Since $I_{VLIMIT}$ is above the normal valley current threshold, in normal conditions, this has no effect in normal operation (save maybe a minor additional delay due to extra logic). As above, once the PMOS peak current limit has triggered, this may result in subharmonic oscillations, but the resulting loss of spectral control is not important as this is a fault-mode condition.

It is also possible to operate the main loop where the PMOS is not allowed to turn on until after the NMOS current has reduced below $I_{VLIMIT}$ in normal operation regardless of whether the PMOS current limit has triggered. Again in most conditions, this has no effect, since the NMOS current is normally well below $I_{VLIMIT}$ but it is found to help constrain operation under some conditions. The comparator circuit comparing the PMOS current with the peak current limit will have certain logic and propagation delays associated therewith, with the result that there will be a minimum conduction period for the PMOS for the current limit to trigger. If operating conditions are such that the PMOS is turned on, in normal control mode, for a period of time in a cycle which is shorter than this minimum conduction period, the PMOS peak current limit will not trigger in that cycle, even if the PMOS current is above the current limit. Were there no independent valley current threshold this behaviour could be repeated in several cycles with the current increasing above the peak current limit but the peak current limit never being triggered. Having an independent valley current threshold prevents such behaviour as the PMOS would be inhibited from turning on if the inductor current is above the valley current threshold even if the peak current limit had not been triggered. There will of course also be a minimum conduction period associated with the NMOS conduction to allow the valley current threshold to be determined but it will be clear that in the situation where the PMOS is on for a very short time there will be plenty of time to determine the inductor current when the PMOS is off.

Whilst the above embodiments have been described in relation to a DC-DC buck converter the embodiments of the invention can be applied gene rally to switching regulators. The switching regulator may be part of a power management apparatus such as a power management integrated circuit (i.e. a PMIC). The embodiments of the invention may be useful for power management of any sub-systems of any form of electrical device, whether having a single power source or multiple power sources and whether portable or not. The embodiments of the present invention are particularly applicable to portable devices however such as: mobile computing devices such as laptops, netbooks, PDAs and the like; mobile communication devices such as radio telephones, cellular telephone, mobile email devices and the like; personal media players such as MP3 or other audio players, personal radios, video players; portable video game consoles and devices; personal navigation devices such as satellite navigators and GPS receivers, whether in-vehicle or hand-held or any other portable or battery operated device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A method of current limiting in a DC-DC converter comprising:
   monitoring, when a high side switch is turned on, whether a first signal indicative of the current in the converter is above a first threshold;
   in the event that the first signal is above the first threshold, turning the high side switch off;
   monitoring, when the high side switch is turned off, whether a second signal indicative of the current in the converter is above a second threshold; and
   in the event that the second signal is above the second threshold, inhibiting turn on of the high side switch,
   wherein said monitoring of the second signal with respect to the second threshold is applied independently of said monitoring of the first signal with respect to the first threshold, such that turn-on of the high side switch is inhibited if the second signal is above the second threshold irrespective whether or not the high side switch was turned off because the first signal was above the first threshold.

2. A method as claimed in claim 1 comprising the step of, in the event that the first signal is above the first threshold, turning a low side switch on.

3. A method as claimed in claim 2 wherein, when the low side switch is turned on in response to the first signal being above the first threshold, the low side switch is maintained on until the high side switch turns on or until a low side off control signal is received.

4. A method as claimed in claim 1 further comprising the step of monitoring, when a low side switch is turned on, whether the second signal or a third signal indicative of the current in the converter is below a third threshold and, in the event that the third signal is below the third threshold, generating a low side off control signal.

5. A method as claimed in claim 1 wherein, when turn on of the high side switch is not inhibited, the high side switch turns on in response to a first control signal.

6. A method as claimed in claim 5 wherein the first control signal is derived from a clock signal.

7. A method as claimed in claim 6 wherein the clock signal has a constant frequency.

8. A method as claimed in claim 1 wherein the method is used during a start up mode of operation.

9. A method as claimed in claim 8 wherein, during the start-up mode of operation, a voltage loop of the converter is ignored.

10. A method as claimed in claim 8 wherein, during the start up mode of operation, at least one of the first threshold and the second threshold is increased over time.

11. A method as claimed in claim 10 wherein the first and/or second threshold levels are increased in a plurality of steps.

12. A method as claimed in claim 10 wherein the initial threshold level for the second threshold during start up mode is substantially zero current.

13. A method as claimed in claim 8 comprising operating in a start-up mode of operation until the output voltage of the converter is beyond an output voltage threshold and thereafter operating the DC-DC converter in a normal mode of operation.

14. A method as claimed in claim 13 wherein if the output threshold is not reached within a first period of time after the beginning of start up mode the converter is deactivated.

15. A method as claimed in claim 1 wherein, in normal mode of operation, the converter is operated in a valley current mode control mode.

16. A method as claimed in claim 15 wherein, in normal mode of operation, the second threshold is set above the expected operating valley current.

17. A method as claimed in claim 1 wherein the step of inhibiting turn on of the high side switch in response to the second signal being beyond the second threshold is only performed if a low side switch has been turned on in response to the first signal being beyond the first threshold.

18. A method as claimed in claim 1 wherein the first signal is determined from the electric properties of the high side switch when turned on and the second signal is derived from the electrical properties of a low side switch when turned on.

19. A method as claimed in claim 1 wherein the DC-DC converter comprises an inductor having an inductance and is configured to receive a high side supply voltage and to output an output voltage, wherein the converter is operated at a switching frequency, and wherein at least one of the first threshold and the second threshold varies according to at least one of the high side supply voltage, the output voltage of the converter, the switching frequency and the inductance of the inductor.

20. A DC-DC converter comprising:
an inductor operably connected between a first node and an output node;
a high side switch operably connected between a high side supply input node and the first node;
a low side switch operably connected between a low side supply input node and the first node;
switch control circuitry operable to control the said high side and low side switches;
wherein the switch control circuitry comprises:
first current limiting circuitry for monitoring, when the high side switch is on, a first signal indicative of the current in the inductor, and turning the high side switch off if said first signal is beyond a first threshold; and
second current limiting circuitry for monitoring, when the high side switch is off, a second signal indicative of the current in the inductor, and inhibiting turn on of the high side switch if said second signal is beyond a second threshold,
wherein said second current limiting circuitry is independent of said first current limiting circuitry, such that turn-on of the high side switch is inhibited if the second signal is above the second threshold irrespective whether or not the high side switch was turned off because the first signal was above the first threshold.

21. A DC-DC converter as claimed in claim 20 wherein the high side switch comprises a p-channel transistor and the first current limiting circuitry comprises a first comparator arranged to compare the source-drain voltage of the p-channel transistor with the first threshold.

22. A DC-DC converter as claimed in claim 20 wherein the low side switch comprises an n-channel transistor and the second current limiting circuitry comprises a second comparator arranged to compare the source-drain voltage of the n-channel transistor with the second threshold.

23. A DC-DC converter as claimed in claim 20, wherein the switch control circuitry is configured to, in a start-up mode of operation, control turn on of the high side switch based on a clock signal.

24. A DC-DC converter as claimed in claim 20 wherein the first current limiting circuitry is configured, in a start-up mode of operation, to increase the first threshold over time and/or wherein the second current limiting circuitry is configured, in said start-up mode of operation, to increase the second threshold over time.

25. A DC-DC converter as claimed in claim 20 wherein the switch control circuitry is configured to turn the low side switch off if the current in the inductor when the low side switch is on reaches a third threshold.

26. A DC-DC converter as claimed in claim 20, wherein the switch control circuitry, in a normal mode of operation, is configured to provide valley current mode control.

27. A power management integrated circuit comprising a DC-DC converter as claimed in claim 20.

28. An electronic device comprising a DC-DC converter as claimed in claim 20.

29. An electronic device as claimed in claim 28 wherein the device is one of: a portable computing device; a laptop computer; a personal data assistant; a personal media player; an mp3 player; a portable television; a mobile communications device; a mobile telephone; a navigation aid; a GPS device; a game console.

* * * * *